US008739509B2

(12) United States Patent
Asanaka et al.

(10) Patent No.: US 8,739,509 B2
(45) Date of Patent: Jun. 3, 2014

(54) SINGLE SHAFT COMBINED CYCLE POWER PLANT START-UP METHOD AND SINGLE SHAFT COMBINED CYCLE POWER PLANT

(75) Inventors: Toshitada Asanaka, Tokyo (JP); Manabu Tateishi, Kanagawa (JP); Masayuki Tobou, Kanagawa (JP); Kouichi Kitaguchi, Kanagawa (JP); Masao Ito, Kanagawa (JP); Takehiko Matsushita, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 909 days.

(21) Appl. No.: 12/772,556

(22) Filed: May 3, 2010

(65) Prior Publication Data
US 2010/0281877 A1    Nov. 11, 2010

(30) Foreign Application Priority Data
May 8, 2009    (JP) ................. 2009-113610

(51) Int. Cl.
*F02C 6/00*    (2006.01)
*F02G 1/00*    (2006.01)
*F02G 3/00*    (2006.01)

(52) U.S. Cl.
USPC ..................................... 60/39.182

(58) Field of Classification Search
USPC ............... 60/778, 786, 787, 39.15, 39.163, 60/39.181, 39.182, 39.5
See application file for complete search history.

(56) References Cited

U.S. PATENT DOCUMENTS

| 5,042,246 | A | | 8/1991 | Moore et al. |
| 5,203,160 | A | * | 4/1993 | Ozono ........................... 60/778 |
| 6,339,926 | B1 | * | 1/2002 | Ichiro et al. ................. 60/39.182 |
| 2002/0029572 | A1 | * | 3/2002 | Kangai et al. .................... 60/685 |
| 2010/0162721 | A1 | * | 7/2010 | Welch et al. ..................... 60/778 |

FOREIGN PATENT DOCUMENTS

| EP | 0 083 109 A2 | 7/1983 |
| EP | 0 908 603 A1 | 4/1999 |
| JP | 58-160502 A | 9/1983 |
| JP | 02-196113 A | 8/1990 |
| JP | 04-159402 A | 6/1992 |
| JP | 06-185310 A | 7/1994 |
| JP | 07-158407 A | 6/1995 |
| JP | 08-086227 A | 4/1996 |
| JP | 11-336510 A | 12/1999 |

OTHER PUBLICATIONS

Srinivas, Thermodynamic modeling and optmization of multi-pressure heat recovery generator in combined power cycle Oct. 2008, Journal of Scientific and Industrial Research, vol. 67, pp. 829 and 832.*

* cited by examiner

*Primary Examiner* — Phutthiwat Wongwian
*Assistant Examiner* — William Breazeal
(74) *Attorney, Agent, or Firm* — Foley & Lardner LLP

(57) ABSTRACT

In a start-up method of a single shaft combined cycle power plant, during a time period from when the gas turbine is started up to when rotation speed of the gas turbine reaches a rotation speed allowing self-sustained operation using the combustion gas, auxiliary steam from the start-up boiler is fed to the low-pressure steam turbine via the low-pressure turbine steam supply pipe by controlling valve opening degree of the auxiliary steam flow control valve. The low-pressure steam turbine generates a drive force. Speed-up control is performed in a unified manner for the gas turbine, the high-pressure steam turbine, the low-pressure steam turbine, and the power generator.

12 Claims, 10 Drawing Sheets

SINGLE SHAFT COMBINED CYCLE POWER PLANT START-UP METHOD AND SINGLE SHAFT COMBINED CYCLE POWER PLANT

CROSS REFERENCES TO RELATED APPLICATIONS

This application is based upon and claims the benefit of priority from the prior Japanese Patent Application No. 2009-113610, filed in the Japanese Patent Office on May 8, 2009, the entire content of which is incorporated herein by reference.

BACKGROUND OF THE INVENTION

The present invention relates to a single shaft combined cycle power plant start-up method. More specifically, the invention relates to a single shaft combined cycle power plant start-up method that uses steam fed from a steam source different from an exhaust heat recovery boiler to generate a torque in a steam turbine so as to start up a single shaft combined cycle power plant. Further, the present invention relates to the single shaft combined cycle power plant.

A combined power plant is a power plant that introduces exhaust heat gas of a gas turbine into an exhaust heat recovery boiler to generate high temperature, high-pressure steam and uses the generated steam as a drive source of a steam turbine. The gas turbine is basically driven by combustion gas. However, in the case of a gas turbine of a type in which a gas turbine compressor is coaxially provided, the gas turbine needs to be driven by an auxiliary start-up device until the gas turbine itself reaches a rotation speed at which a torque greater than a torque required to drive the gas turbine compressor is generated and self-sustained operation is achieved, that is, during a time period (starting from a turning operation to purge operation and subsequent ignition of the gas turbine) during which the gas turbine operates at a predetermined rotation speed.

In a single shaft combined power plant in which a gas turbine, a gas turbine compressor, a steam turbine, and a power generator are coaxially connected to one another through couplings, there have been adopted, as a start-up method of a shaft (gas turbine, gas turbine compressor, steam turbine and electric power generator are collectively referred to as "shaft"), the following methods: a method in which a cranking electric motor and a torque converter are used to drive the shaft; and a method in which a static start-up device (also referred to as "Load Commuted Inverter") constituted by a semiconductor device such as a thyristor is used to start a power generator as a synchronous electric motor. Further, there has been adopted a method in which steam fed from an auxiliary steam boiler provided in a power plant is used to drive a steam turbine (refer to, e.g., Japanese Patent Application Laid-Open Publication No. 8-86227 (hereinafter referred to as "Patent Document 1"), the entire content of which is incorporated herein by reference).

As an example of the above method in which steam fed from an auxiliary steam boiler provided in the power plant is used to drive the steam turbine, there has recently been proposed a start-up method in which steam fed from a package boiler is fed to a high-pressure steam turbine to start a gas turbine and speed up the same to a rotating speed at which self-sustained operation of the gas turbine is achieved (refer to, e.g., Japanese Patent Application Laid-Open Publication No. 11-336510 (hereinafter referred to as "Patent Document 2")).

As a result of investigations by the present inventors, it has been found that the start-up method of a high-pressure steam turbine in a single shaft combined power plant of the type disclosed in Patent Document 2 has the following problems.

A first problem is that plant installation cost is increased to make the power plant undesirable from an economic view point.

In a single shaft combined cycle power plant, auxiliary steam is generally used for steam turbine gland sealing, condensate deaeration, or low-pressure steam turbine cooling and, in consideration of an appropriate enthalpy and controllability of the auxiliary steam in the above use condition, the pressure and temperature of the auxiliary steam are generally set to about 0.7 MPa and 220 degrees Celsius, respectively.

In terms of economic efficiency of the plant, it is preferable to lower the pressure and temperature of the package boiler. However, in the method as disclosed in Patent Document 2 in which the auxiliary steam is introduced into the high-pressure steam turbine to start the single shaft combined cycle power plant, auxiliary steam of a higher pressure and higher temperature is required. Accordingly, in the case where the auxiliary steam is used for other purposes, the pressure and temperature thereof need to be reduced and thus a pressure reduction device and a temperature reduction device are required. The installation of the pressure reduction device and temperature reduction device leads to increased cost to adversely affect economic efficiency.

A high-pressure main steam control valve, which fully opens during the rated operation of the plant, is provided at the inlet of the high-pressure steam turbine. This valve is designed to control a large flow of high temperature, high-pressure steam and is therefore unsuitable for control of a small flow of steam performed at the time of starting-up the single shaft combined cycle power plant. Thus, in order to practice the start-up method of Patent Document 2 in the single shaft combined cycle power plant, it is necessary to provide a pressure control valve used exclusively for start-up time in addition to the high-pressure main steam control valve used during the rated operation of the plant. In this regard, economic efficiency is adversely affected.

A second problem is that it is difficult to apply a steam cooling method as a cooling method of a gas turbine high temperature part.

In the latest gas turbine, in order to increase the inlet temperature of the gas turbine for the purpose of improving plant thermal efficiency, there has been adopted a steam cooling method that uses steam with excellent heat transfer coefficient in place of an air cooling method that uses air as a medium for cooling a stator blade assembly or rotor blade assembly which is a high temperature part of the gas turbine. The present inventors have found that a use of the steam cooling type gas turbine as a component of the single shaft combined cycle power plant makes it very difficult to apply the start-up method of Patent Document 2.

That is, in the case of a single shaft combined cycle power plant in which the steam cooling method has been adopted, a method is configured such that exhaust steam of a high-pressure turbine is fed to a gas turbine cooling unit as a cooling medium and then fed to a high temperature part of the gas turbine. In the initial phase (including start-up phase and speed-up phase) of the start-up of the plant, a cooling method of the gas turbine is in an air cooling mode since steam has not yet been fed to the high-pressure steam turbine. Accordingly, air discharged from a gas turbine compressor is fed to the gas turbine cooling unit, and this air is used to cool the gas turbine. After that, when steam which is generated in the exhaust heat recovery boiler along with the progress of a start-up phase of the plant is fed to the high-pressure steam turbine to generate exhaust steam in the high-pressure steam, the cooling medium in the cooling unit changes from the discharged air of the compressor to exhaust steam of the high-pressure steam turbine, whereby the steam cooling is achieved.

However, at the initial phase of the start-up of the plant, at which the cooling method is in an air cooling mode, the pressure of the air discharged from the gas turbine compressor is in a range of about 0.7 MPa to 0.9 MPa. On the other hand, in most cases, the pressure steam condition of the auxiliary steam is set to about 0.7 MPa in terms of economic efficiency.

Assume that the high-pressure steam turbine start-up method as disclosed in Patent Document 2 is applied as the single shaft combined cycle power plant start-up method in which the steam cooling method has been adopted. In this case, the pressure of an exhaust section of the high-pressure steam turbine is held in a range of about 0.7 MPa to 0.9 MPa by the discharged air of the gas turbine compressor, if the auxiliary steam whose pressure is held at 0.7 MPa is fed to the upstream side of the high-pressure main steam control valve. Therefore, the auxiliary steam is not allowed to flow in the high-pressure steam turbine (that is, the auxiliary steam cannot be fed to the high-pressure steam turbine) in a state where the pressure relationship is reversed. Thus, the start-up device based on this assumption cannot function.

Of course, when the pressure of the auxiliary steam is increased, the problem is alleviated. However, as described above, an auxiliary boiler for supplying the high-pressure steam is generally expensive. Further, an increase in the pressure inevitably incurs an increase in the steam temperature. Thus, considering a fact that a pressure reduction device and a temperature reduction device need to be provided for multiple use purposes (e.g., for use as gland steam or deaeration steam) of the auxiliary steam, adoption of high-pressure auxiliary steam having a pressure far exceeding 0.7 MPa is not practical.

A third problem is that in the case where hot start-up is performed during DSS (Daily Start-up & Stop) operation, reverse mismatch phenomenon occurs between the metal temperature of the high-pressure steam turbine and auxiliary steam temperature.

The single shaft combined cycle power plant including not only a single shaft combined cycle power plant of a steam cooling type but also a single shaft combined cycle power plant of an air cooling type can start/stop at short times and therefore can be operated under DSS in which the plant is started and stopped on a per day basis. In the case where hot start-up is performed, that is, in the case where the plant is restarted within a comparatively short time period after the stop of the turbine, the metal temperature has been decreased to a range of about 400 degrees Celsius to 500 degrees Celsius, while the temperature of the auxiliary steam whose pressure is held at 0.7 MPa is no more than about 230 degrees Celsius.

At this time, reverse mismatch state in which the metal temperature is higher than the temperature of the auxiliary temperature flowing in the high-pressure steam turbine is established. If the hot start-up is performed in this reverse mismatch state, the steam turbine may be broken. Therefore, the high-pressure steam turbine start-up method is not suitable for the hot start-up. This imposes a fatal operational restriction on the single shaft combined cycle power plant that is easily ready for operation under DSS.

BRIEF SUMMARY OF THE INVENTION

The present invention has been made in view of the above problems, and an object thereof is to provide a single shaft combined cycle power plant start-up method that feeds auxiliary steam, not to a high-pressure steam turbine, but to a low-pressure steam turbine through a low-pressure control valve to drive a gas turbine so as to increase the rotation speed of the gas turbine up to a rotation speed at which self-sustained operation of the gas turbine is achieved, and a single shaft combined cycle power plant.

According to an aspect of the present invention, there is presented a single shaft combined cycle power plant comprising: a gas turbine that is driven by combustion gas and discharges exhaust gas; an exhaust heat recovery boiler that uses the exhaust gas from the gas turbine as a heat source and includes a high-pressure drum for generating high-pressure steam and a low-pressure drum for generating low-pressure steam having a pressure lower than that of the high-pressure steam; a high-pressure steam turbine that is coaxially arranged with the gas turbine and driven by the high-pressure steam fed from the high-pressure drum via a high-pressure steam control valve; a low-pressure steam turbine that is coaxially arranged with the high-pressure steam turbine; a power generator that is coaxially arranged with the low-pressure steam turbine; a low-pressure turbine steam supply pipe that has a low-pressure main steam control valve and feeds the low-pressure steam from the low-pressure drum to the low-pressure steam turbine via the low-pressure main steam control valve; a start-up boiler that generates auxiliary steam; a start-up time auxiliary steam supply pipe that connects the start-up boiler with the low-pressure turbine steam supply pipe at upstream side relative to the low-pressure main steam control valve and feeds auxiliary steam at start-up time; an auxiliary steam flow control valve that controls flow rate of steam fed from the start-up time auxiliary steam supply pipe to the low-pressure turbine steam supply pipe; and a controller that feeds auxiliary steam from the start-up boiler to the low-pressure steam turbine via the low-pressure turbine steam supply pipe by controlling valve opening degree of the auxiliary steam flow control valve to allow the low-pressure steam turbine to generate a drive force to thereby perform speed-up control in a unified manner for the gas turbine, the high-pressure steam turbine, the low-pressure steam turbine, and the power generator during a time period from when the gas turbine is started up to when rotation speed of the gas turbine reaches a rotation speed allowing self-sustained operation using the combustion gas.

According to another aspect of the present invention, there is presented a start-up method of a single shaft combined cycle power plant comprising: a gas turbine that is driven by combustion gas and discharges exhaust gas; an exhaust heat recovery boiler that uses the exhaust gas from the gas turbine as a heat source and includes a high-pressure drum for generating high-pressure steam and a low-pressure drum for generating low-pressure steam having a pressure lower than that of the high-pressure steam; a high-pressure steam turbine that is coaxially arranged with the gas turbine and driven by the high-pressure steam fed from the high-pressure drum via a high-pressure steam control valve; a low-pressure steam turbine that is coaxially arranged with the high-pressure steam turbine; an electric power generator that is coaxially arranged with the low-pressure steam turbine; a low-pressure turbine steam supply pipe that has a low-pressure main steam control valve and feeds the low-pressure steam from the low-pressure drum to the low-pressure steam turbine via the low-pressure main steam control valve; a start-up boiler that generates auxiliary steam; a start-up time auxiliary steam supply pipe that connects the start-up boiler with the low-pressure turbine steam supply pipe at upstream side relative to the low-pressure main steam control valve and feeds auxiliary steam at start-up time; and an auxiliary steam flow control valve that controls flow rate of steam fed from the start-up time auxiliary steam supply pipe to the low-pressure turbine steam supply pipe, wherein during a time period from when the gas turbine is started up to when rotation speed of the gas turbine reaches a rotation speed allowing self-sustained operation using the combustion gas, auxiliary steam from the start-up boiler is fed to the low-pressure steam turbine via the low-pressure turbine steam supply pipe by controlling valve opening degree of the auxiliary steam flow control valve to allow the low-pressure steam turbine to generate a drive force to thereby perform speed-up control in a unified manner for the gas turbine, the high-pressure steam turbine, the low-pressure steam turbine, and the power generator.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAILED DESCRIPTION OF THE INVENTION

Embodiments of the present invention will be described below with reference to the accompanying drawings. Throughout the accompanying drawings, the same reference numbers are assigned to same or similar components, and overlapping descriptions thereof are omitted.

(First Embodiment)

Figure 1:
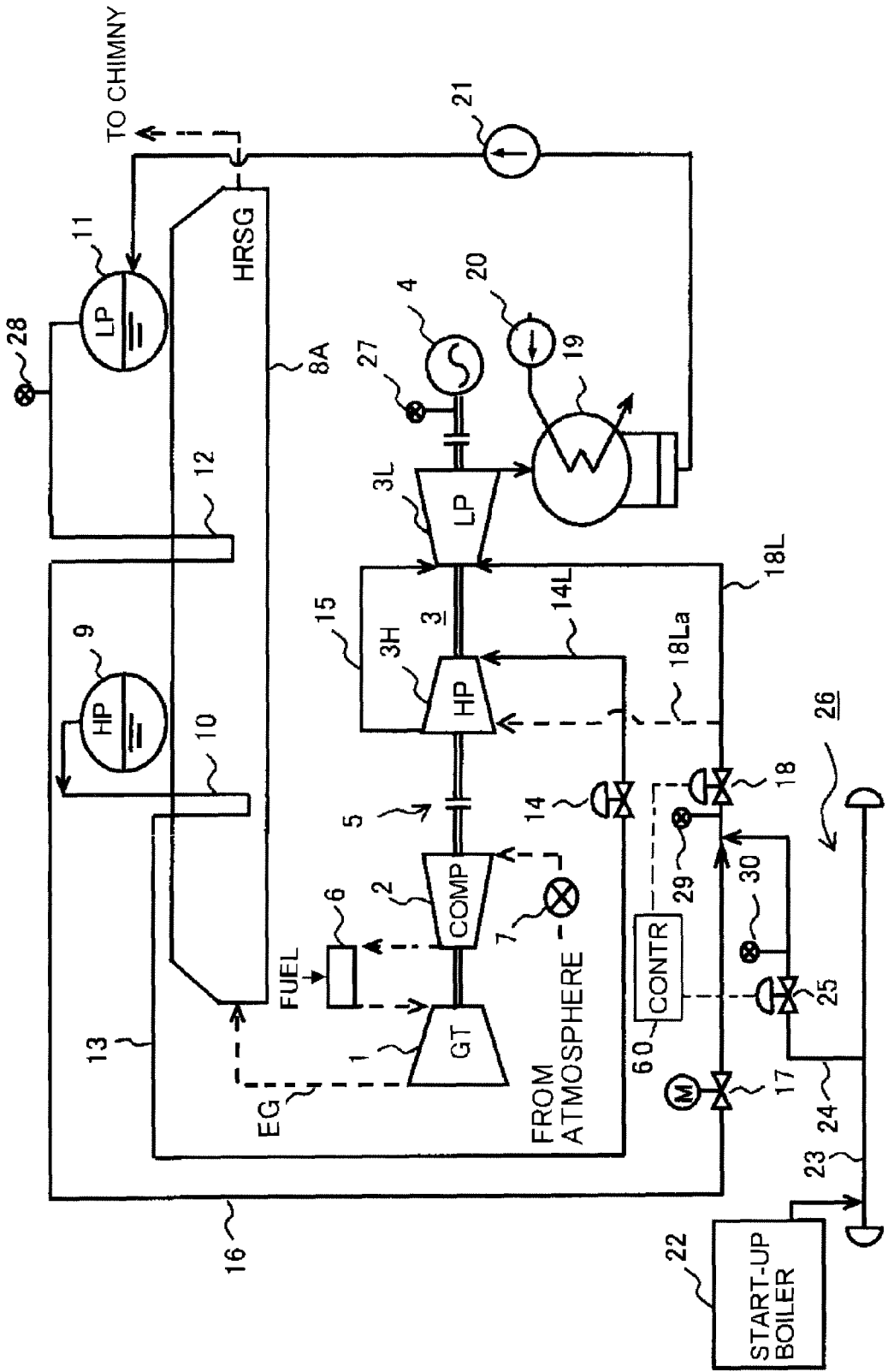
FIG. 1 is a system diagram showing the main part of a single shaft combined cycle power plant according to a first embodiment of the present invention.
Figure 2:
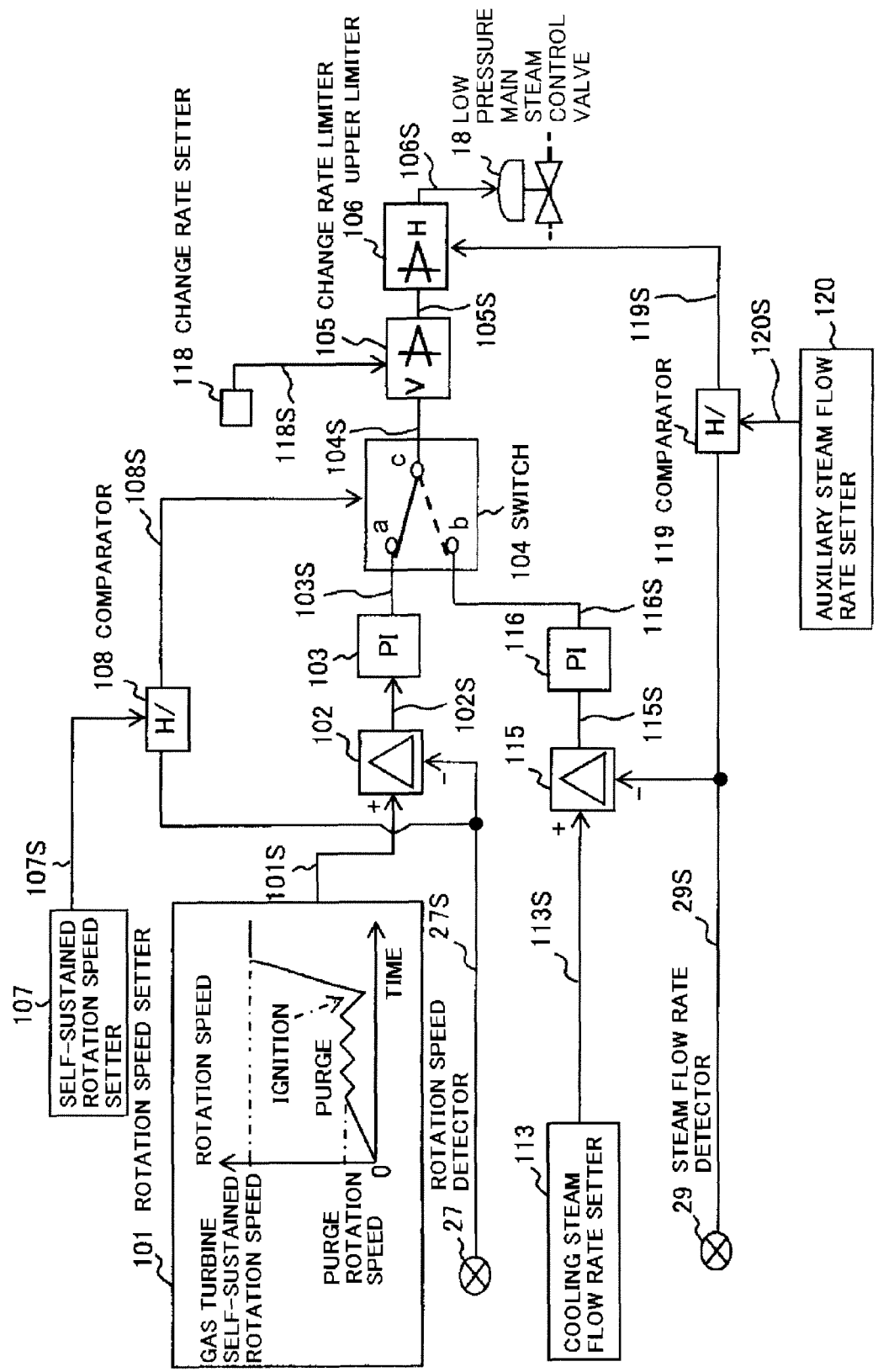
FIG. 2 is a configuration diagram of a control circuit for low-pressure main steam control valve provided in a start-up controller according to the first embodiment of the present invention.
Figure 3:
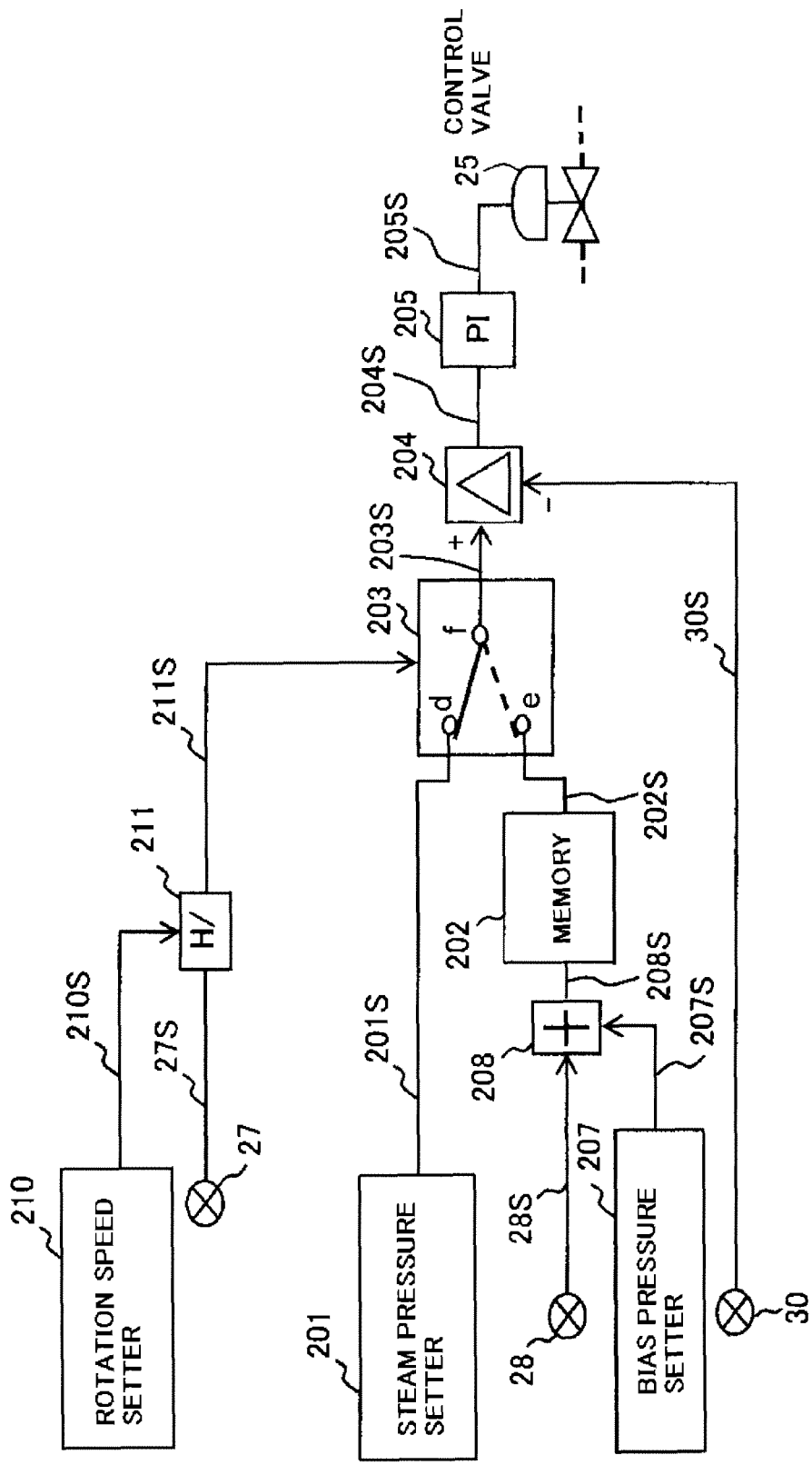
FIG. 3 is a configuration diagram of a control circuit for auxiliary steam flow control valve provided in the start-up controller according to the first embodiment of the present invention.
Figure 4:
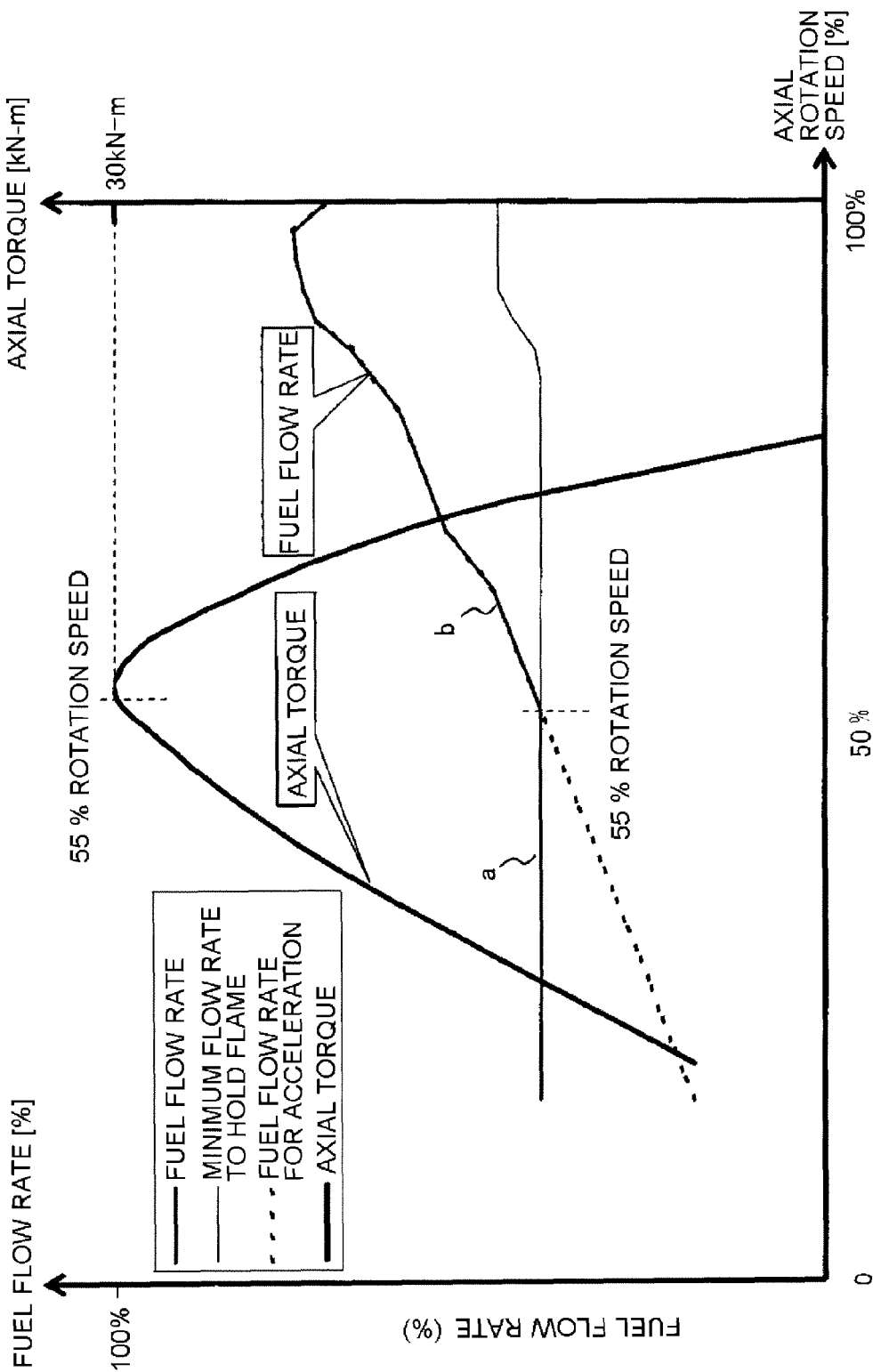
FIG. 4 is a characteristic diagram showing a relationship between fuel flow rate and shaft torque with respect to shaft rotation speed during start-up and speed-up phase of a gas turbine.

FIG. 1 is a system diagram showing the main part of a single shaft combined cycle power plant according to a first embodiment of the present invention. FIGS. 2 and 3 are configuration diagrams of a control circuit for low-pressure main steam control valve and a control circuit for auxiliary steam flow control valve, respectively, both of which are provided in a start-up controller 60 of the single shaft combined cycle power plant (hereinafter, sometimes referred to merely as "controller") according to the first embodiment. FIG. 4 is a characteristic diagram showing a relationship between the fuel flow rate and the rotation speed during start-up and speed-up phase of a gas turbine 1.

First, a system configuration of the single shaft combined cycle power plant according to the first embodiment will be described with reference to FIG. 1.

Reference numeral 1 denotes a gas turbine (GT), reference numeral 2 denotes a gas turbine compressor (COMP), reference numeral 3 denotes a steam turbine constituted by a high-pressure steam turbine 3H and a low-pressure steam turbine 3L, and reference numeral 4 denotes a power generator, the rotary shafts of all of which are coaxially connected to one another via couplings. The rotary portions of the gas turbine 1, the gas turbine compressor 2, the high-pressure steam turbine 3H, the low-pressure steam turbine 3L, and the power generator 4 which are coaxially coupled to one another is referred to as a "shaft" 5. Thus, the rotation speed of the shaft 5 represents the same meaning as the rotation speed of the gas turbine 1 or the rotation speed of the steam turbine 3.

High-pressure, high temperature compressed air discharged from the gas turbine compressor 2 is fed to a combustor 6 where it is mixed with fuel and the fuel is burned to generate combustion gas. The generated combustion gas is adiabatically expanded in the gas turbine 1 to rotationally drive the gas turbine 1. The flow rate of the compressed air to be fed to the combustor 6 can be controlled by adjusting the valve opening degree of an inlet guide valve (IGV) provided on the inlet side of the gas turbine compressor 2.

Exhaust gas (EG) discharged from the gas turbine 1 is introduced to a two-pressure exhaust heat recovery boiler (HRSG) 8A and is subjected to heat exchange with feedwater or steam by a high-pressure superheater 10 connected to a high-pressure drum 9, a low-pressure superheater 12 connected to a low-pressure drum 11, and heat exchangers (not shown) such as an evaporator or an economizer connected respectively to the high-pressure drum 9 and low-pressure drum 11. The resultant gas is emitted to the atmosphere through a chimney (not shown).

High-pressure steam generated in the high-pressure drum 9 of the exhaust heat recovery boiler 8A is superheated by the high-pressure superheater 10, then fed, through a high-pressure main steam pipe 13, to a high-pressure main steam control valve 14 where the pressure thereof is controlled, and then introduced into the high-pressure steam turbine 3H through a high-pressure main steam control valve lead pipe 14L. In the high-pressure steam turbine 3H, the high-pressure steam is adiabatically expanded to rotationally drive rotor blades, followed by discharge. The discharged high-pressure steam is then introduced into the low-pressure steam turbine 3L through a low-pressure steam pipe 15.

Low-pressure steam generated in the low-pressure drum 11 is superheated by the low-pressure superheater 12, then fed, through a low-pressure main steam pipe 16 and a low-pressure steam isolation valve 17 provided in the middle of the low-pressure main steam pipe 16, to a low-pressure main steam control valve 18 where the pressure thereof is controlled. The low-pressure steam is then introduced into the low-pressure steam turbine 3L through a low-pressure main steam control valve lead pipe 18L.

The low-pressure steam isolation valve 17 is configured to open when the temperature and the pressure of the low-pressure steam superheated by the low-pressure superheater 12 satisfy a predetermined condition. The low-pressure superheater 12 is constituted by, e.g., an electrically operated valve.

In FIG. 1, pipe arrangement is made such that the low-pressure steam passing through the low-pressure main steam control valve 18 is directly introduced into the low-pressure steam turbine 3L by way of the low-pressure main steam control valve lead pipe 18L. The piping may be altered such that the low-pressure steam passing through the low-pressure main steam control valve 18 is introduced into the middle stage (vicinity of an exhaust portion) of the high-pressure steam turbine 3H by way of a low-pressure main steam control valve lead pipe 18La denoted by a broken arrow. Also in this case, the steam flow passing through the low-pressure main steam control valve 18 does not generate effective torque in the high-pressure steam turbine 3H.

A steam system in which the low-pressure steam superheated by the low-pressure superheater 12 is fed to the low-pressure steam turbine 3L through the low-pressure main steam pipe 16, the low-pressure main steam control valve 18, the low-pressure main steam control valve lead pipe 18L, and the like, or a steam system in which the low-pressure steam superheated by the low-pressure superheater 12 is fed to the low-pressure steam turbine 3L through the low-pressure main steam pipe 16, the low-pressure main steam control valve 18, the low-pressure main steam control valve lead pipe 18La denoted by the broken arrow, a casing of the high-pressure steam turbine 3H, and the low-pressure steam pipe 15 is referred to as "low-pressure turbine steam supply system" for the sake of convenience in the present specification.

The steam that has passed through the low-pressure steam pipe 15 after performing the expansion work in the high-pressure steam turbine 3H and the steam that has been discharged from the low-pressure main steam pipe 16 and passed through the low-pressure main steam control valve 18 and the low-pressure main steam control valve lead pipe 18L are mixed together inside the low-pressure steam turbine 3L. The mixed steam is adiabatically expanded to rotationally drive rotor blades and is then discharged into a condenser 19 where the discharged steam is subjected to heat exchange with cooling water pumped into the condenser 19 by a circulating water pump 20 to be condensed into condensate.

The condensate is pumped into a water feed pump 21 by a not shown condensate pump where it is subjected to pressure application by the water feed pump 21 and is then fed to the low-pressure drum 11 in the exhaust heat recovery boiler 8A.

Thus, in the single shaft combined cycle power plant, the gas turbine 1 gives a drive force to the shaft 5 by utilizing the adiabatic expansion of combustion gas and, further, the high-pressure steam turbine 3H and the low-pressure steam turbine 3L give drive forces to the shaft 5 by utilizing adiabatic expansion of the steam, whereby the power generator 4 is driven to generate electric power.

Reference numeral 22 denotes a start-up boiler which is configured to generate auxiliary steam having a steam pressure of about 0.7 MPa at the start-up time of the single shaft combined cycle power plant. The start-up boiler 22 is connected to the low-pressure main steam pipe 16 at the portion between the low-pressure steam isolation valve 17 and the low-pressure main steam control valve 18 through an "auxiliary steam supply pipe" constituted by an auxiliary steam supply main pipe 23 and an auxiliary steam supply branch pipe 24 branched from the auxiliary steam supply main pipe 23.

Reference numeral 25 denotes an auxiliary steam flow control valve provided in the middle of the auxiliary steam supply branch pipe 24 and is configured to control the flow rate of the auxiliary steam to be fed to the low-pressure main steam control valve 18 at the start-up time of the single shaft combined cycle power plant.

The above connection configuration of the steam pipes makes the auxiliary steam with about 0.7 MPa pressure output from the start-up boiler 22 to be mixed with and low-pressure steam that has passed through the low-pressure steam isolation valve 17 on the upstream side of the low-pressure main steam control valve 18.

A steam system including the start-up boiler 22, auxiliary steam supply main pipe 23, the auxiliary steam supply branch pipe 24, and the auxiliary steam flow control valve 25 connected to the auxiliary steam supply branch pipe 24 is referred to as "start-up time auxiliary steam supply pipe 26" for the sake of convenience. The start-up time auxiliary steam supply pipe 26 feeds the auxiliary steam from the start-up boiler 22 to the upstream side of the low-pressure main steam control valve 18.

A commonly-used boiler provided with combustion equipment is assumed to be used as the start-up boiler 22. However, as a means for generating steam, there is available a plant configuration that utilizes part of steam that an existing power generation unit in operation generates for power generation, and the present invention may also be applied to this case. Further, although a control valve that uses air as a drive source to control the pressure of the auxiliary steam is assumed to be used as the auxiliary steam flow control valve 25, the auxiliary steam flow control valve 25 may be an electrically operated valve having both functions of pressure control and blocking of the flow of the auxiliary steam.

Reference numeral 27 denotes a rotation speed detector that detects the rotation speed of the shaft 5, i.e., the shaft rotation speed of the gas turbine 1 and is provided near the power generator 4. Reference numeral 28 denotes a pressure detector that detects the steam pressure of the low-pressure drum 11. Reference numeral 29 denotes a flow rate detector (flow rate transmitter) that detects the flow rate of the steam passing through the low-pressure main steam control valve 18 and is provided on the upstream side of the low-pressure main steam control valve 18 and on the downstream side relative to the mixing point between the low-pressure steam and the auxiliary steam. Reference numeral 30 denotes an auxiliary steam pressure detector that detects the pressure of the auxiliary steam passing through the auxiliary steam flow control valve 25 and is provided in the auxiliary steam supply branch pipe 24 of the start-up time auxiliary steam supply pipe 26.

Next, with reference to FIG. 2, a configuration of a control circuit for low-pressure main steam control valve provided in a start-up controller 60 of the single shaft combined cycle power plant will be described with reference to FIG. 2.

In FIG. 2, reference numeral 101 denotes a rotation speed setter of the gas turbine 1 for normal start-up. As schematically shown by a characteristic curve, the rotation speed setter 101 is programmed in advance such that, in the speed-up phase during which the rotation speed of the gas turbine 1 is changed from zero (start of the start-up phase) to self-sustained rotation speed through purge rotation speed and ignition rotation speed, the rotation speed of the gas turbine 1 reaches a rotation speed setting value 101S required for each elapsed time point.

Reference numeral 102 denotes a subtractor that receives as an input the rotation speed setting value 101S and the rotation speed of the shaft 5, i.e., the shaft rotation speed 27S of the gas turbine 1 detected by the rotation speed detector 27 and subtracts the shaft rotation speed 27S of the gas turbine 1 from the rotation speed setting value 101S to output a deviation 102S.

Reference numeral 103 denotes a PI controller that receives as an input the deviation 102S output from the subtractor 102, performs proportional integral calculation (PI calculation) such that the rotation speed of the shaft 5, i.e., shaft rotation speed 27S of the gas turbine 1 is equal to the rotation speed setting value 101S, and outputs the calculation result as an instruction 103S.

Reference numeral 104 denotes a first switch that selects one of signals applied to two input terminals (a) and (b) and outputs the selected signal from an output terminal (c). The first switch 104 inputs the instruction 103S from the PI controller 103 to the first input terminal (a) and inputs an instruction 116S from a PI controller 116 to be described later to the second input terminal (b). When a start-up instruction is sent out to the shaft 5, the first switch 104 connects the terminals (a) and (c) as denoted by a solid line and outputs the instruction 103S from the PI controller 103 as an instruction 104S. When a switch instruction 108S is sent out from a comparator 108 to be described later, the first switch 104 performs a switch action to connect the terminals (b) and (c) as denoted by a broken line and outputs the instruction 116S from the PI controller 116 as an instruction 104S.

Reference numeral 105 denotes a change rate limiter. Even if a value of the instruction 104S output from the first switch 104, i.e., a value of the instruction 103S or instruction 116S is rapidly changed, the change rate limiter 105 limits a change rate within a previously set change rate 118S and outputs the limitation result as a change rate limited signal 105S.

Reference numeral 106 denotes an upper limiter. When the value of the change rate limited signal 105S output from the change rate limiter 105 provided at the previous stage of the upper limiter 106 is smaller than that of an increase stop instruction 119S output from a comparator 119 to be described later, the upper limiter 106 outputs the input change rate limited signal 105S without change to the low-pressure main steam control valve 18 as a valve opening degree instruction 106S. When the value of the input change rate limited signal 105S is equal to or larger than a limitation value (same meaning as the increase stop instruction as described later), the upper limiter 106 limits the value of the valve opening degree instruction 106S to be output to an limitation value 119S and outputs the limitation value 119S to the low-pressure main steam control valve 18 as the valve opening degree instruction 106S.

The change rate limiter 105 and the upper limiter 106 will be described in detail later.

Reference numeral 107 denotes a self-sustained rotation speed setter that sets the self-sustained rotation speed of the gas turbine 1. Reference numeral 108 denotes a comparator. The comparator 108 compares a setting value 107S set in the self-sustained rotation speed setter 107 of the gas turbine 1 and the shaft rotation speed 27S detected by the rotation speed detector 27. When the shaft rotation speed 27S is equal to or higher than the self-sustained rotation speed setting value 107S, the comparator 108 issues a switch instruction 108S to the first switch 104 to make the first switch 104 switch the connection between terminals (a) and (c) to that between terminals (b) and (c) as described above.

Reference numeral 113 is a cooling steam flow rate setter that sets the flow rate of steam required for cooling the low-pressure steam turbine 3L at "flow rate control operation time" during which the gas turbine 1 rotates at a rotation speed equal to or higher than the self-sustained rotation speed setting value 107S. Reference numeral 115 denotes a subtractor that receives as an input a cooling steam flow rate setting value 113S set in the cooling steam flow rate setter 113 and flow rate 29S of the steam passing through the low-pressure main steam control valve 18 which is detected by the steam flow rate detector 29. The subtractor 115 subtracts the steam flow rate 29S from the cooling steam flow rate setting value 113S to output a deviation 115S.

Reference numeral 116 is a PI controller that performs proportional integral calculation (PI calculation) for the deviation 115S output from the subtractor 115 and outputs a result of the proportional integral calculation to the second input terminal (b) of the first switch 104 as the instruction 116S. Reference numeral 118 denotes a change rate setter that sets a change rate setting value 118S of the change rate limiter 105.

Reference numeral 119 denotes a comparator. The comparator 119 compares the detection signal 29S indicating the flow rate of the steam passing through the low-pressure main steam control valve 18 and a required flow rate setting value 120S to be described later. When the value of the detection signal 29S is equal to or larger than the required flow rate setting value 120S, the comparator 119 outputs a stop instruction 119S so that the valve opening degree of the low-pressure main steam control valve 18 is not increased any more. Reference numeral 120 is an auxiliary steam flow rate setter. The auxiliary steam flow rate setter 120 sets, as a setting value 120S, the auxiliary steam flow rate required for the low-pressure steam turbine 3L to generate a maximum drive torque in the drive torque range required in the turbine speed-up phase.

Next, a configuration of a control circuit for auxiliary steam flow control valve provided in the start-up controller 60 of the single shaft combined cycle power plant will be described with reference to FIG. 3.

In FIG. 3, reference numeral 201 denotes a steam pressure setter that sets a pressure setting value 201S (hereinafter referred to as "first pressure instruction 201S"). The first pressure instruction 201S output from the steam pressure setter 201 is inputted to one input terminal (d) of a second switch 203 to be described later.

Reference numeral 207 denotes a bias pressure setter that sets a bias pressure setting value 207S. The bias pressure setting value 207S output from the bias pressure setter 207 is inputted to one input terminal of an adder 208.

The adder 208 adds the bias pressure setting value 207S and a pressure 28S of the low-pressure drum 11 and outputs an addition result 208S. Reference numeral 202 denotes a memory configured to continuously receive as an input the output 208S from the adder 208 and stores the addition result 208S inputted at a moment when the gas turbine 1 is ignited. The memory 202 outputs the stored pressure value 202S (hereinafter referred to as "second pressure instruction") to the other input terminal (e) of the second switch 203.

The details of the first pressure instruction value 201S and the second pressure instruction value 202S will be described later, and only the concepts thereof are described here.

The value of the first pressure instruction 201S is a pressure value at which the low-pressure main steam control valve 18 is not fully opened even when the low-pressure steam turbine 3L to generate the maximum drive torque required for speed-up of the gas turbine 1 flows in the low-pressure main steam control valve 18. The value of the second pressure instruction 202S is a pressure value at which both the low-pressure steam and auxiliary steam can be fed to the low-pressure steam turbine 3L through the low-pressure main steam control valve 18.

Reference numeral 210 denotes a setter that has a switching rotation speed setting value 210S higher than the rotation speed at which the maximum drive torque of the low-pressure steam turbine 3L is required for the rotation of the gas turbine 1, e.g., 55% speed of the rated speed and lower than the self-sustained rotation speed of the gas turbine 1. The setting value 210S of the setter 210 is inputted to a comparator 211. The comparator 211 outputs a switch instruction 211S to the second switch 203 when the shaft rotation speed 27S of the shaft 5 (gas turbine 1) which is detected by the rotation speed detector 27 becomes the switching rotation speed setting value 210S.

Reference numeral 203 denotes a second switch. As in the case of the first switch 104 described above, the second switch 203 selects one of signals applied to two input terminals (d) and (e) and outputs the selected signal from an output terminal (f). When the shaft 5 (gas turbine 1) is started, the second switch 203 connects the terminals (d) and (f) as denoted by a solid line and outputs the first pressure instruction 201S of the steam pressure setter 201 from the terminal (f) as an output instruction 203S. When the switch instruction 211S is sent out from a comparator 211 to be described later, the second switch 203 performs a switch action to connect the terminals (e) and (f) and outputs the second pressure instruction 202S stored in the memory 202 from the terminal (f) as the output instruction 203S.

Reference numeral 204 denotes a subtractor that receives as an input the pressure instruction 203S selectively outputted from the second switch 203 and an auxiliary steam pressure value 30S detected by the steam pressure detector 30 provided in the auxiliary steam supply branch pipe 24 of the start-up time auxiliary steam supply pipe 26. The subtractor 204 subtracts the pressure detection value 30S from the pressure instruction 203S to output a deviation 204S.

Reference numeral 205 is a PI controller that receives as an input the deviation 204S, performs proportional integral calculation (PI calculation) such that the auxiliary steam pressure value 30S is equal to the pressure instruction 203S, and outputs the calculation result to the auxiliary steam flow control valve 25 as a valve opening degree instruction 205S.

The system configuration of the single shaft combined cycle power plant and the configuration of the control circuit of the start-up controller 60 according to the first embodiment have been described. Next, valve opening control of the low-pressure main steam control valve 18 and the auxiliary steam flow control valve 25 performed at the start-up time of the single shaft combined cycle power plant will be described.

In FIGS. 1 to 4, at the time point when a start-up instruction is sent out to the single shaft combined cycle power plant, the first switch 104 connects the terminals (a) and (c), and the second switch 203 connects the terminals (d) and (f). Further, the auxiliary steam flow control valve 25 and the low-pressure main steam control valve 18 are each fully closed, and the shaft 5 (gas turbine 1) is in a non-rotation state.

At this time, in the control circuit for auxiliary steam flow control valve, the second switch 203 outputs the first pressure instruction 201S of the steam pressure setter 201 as the instruction 203S. The subtractor 204 subtracts the auxiliary steam pressure detection value 30S from the first pressure instruction 203S to output the deviation 204S. However, at the time point when a start-up instruction is sent out to the single shaft combined cycle power plant, the auxiliary steam pressure 30S detected at the downstream of the auxiliary steam flow control valve 25 is zero, so that the first setting value 201S from the steam pressure setter 201 is inputted to the PI controller 205. Then, the PI controller 205 outputs the valve open degree instruction 205S to the auxiliary steam flow control valve 25 such that the pressure 30S obtained when the auxiliary steam passes the auxiliary steam flow control valve 25 is equal to the first setting value 201S. With the above operation, the auxiliary steam flow control valve 25 is opened by a not shown drive unit driven by, e.g., a hydraulic pressure.

The PI controller 205 continues performing the PI calculation in accordance with the deviation 204S outputted from the subtractor 204 until the shaft rotation speed 27S of the gas turbine 1 reaches the switching rotation speed 210S which is set to a value higher than, e.g., 55% speed of the rated speed and lower than the self-sustained rotation speed of the gas turbine 1 and ongoingly outputs the valve open degree instruction 205S to the auxiliary steam flow control valve 25.

As described above, when a start-up instruction is sent out to the single shaft combined cycle power plant, the auxiliary steam flow control valve 25 is opened, and the auxiliary steam from the start-up boiler 22 is fed to the portion of the low-pressure main steam pipe 16 on the upstream side of the low-pressure main steam control valve 18 through the auxiliary steam supply main pipe 23, the auxiliary steam supply branch pipe 24, and the auxiliary steam flow control valve 25.

On the other hand, in the control circuit for low-pressure main steam control valve, at the time point when a start-up instruction is sent out to the single shaft combined cycle power plant, the shaft rotation speed 27S is zero as described above, so that the rotation speed setting value 101S is outputted from the subtractor 102 as the deviation 102S and inputted to the PI controller 103. The PI controller 103 performs proportional integral calculation (PI calculation) for the deviation 102S such that the shaft rotation speed 27S of the shaft 5 (gas turbine 1) may become equal to the rotation speed setting value 101S and outputs the calculation result 103S.

At the time point when the start-up instruction is sent out, the switch signal 108S has not been outputted from the comparator 108, so that the calculation result 103S of the PI controller 103 is output, without change, from the first switch 104 as the instruction 104S. The instruction 104S outputted from the first switch 104 is subjected to the change rate limitation by the change rate limiter 105 to be outputted as the change rate limited signal 105S, and the upper value of the signal 105S is limited by the upper limiter 106 to be outputted as the valve opening degree instruction 106S. The valve opening degree instruction 106S is then given to a not shown hydraulic drive unit, whereby opening of the low-pressure main steam control valve 18 is started.

When the valve of the low-pressure main steam control valve 18 is opened, the auxiliary steam from the start-up boiler 22 is fed to the portion of the low-pressure main steam pipe 16 on the downstream side of the low-pressure steam isolation valve 17 through the auxiliary steam supply main pipe 23 of the start-up time auxiliary steam supply pipe 26, the auxiliary steam supply branch pipe 24 of the same, and the auxiliary steam flow control valve 25 of the same. The auxiliary steam that has been fed to the low-pressure main steam pipe 16 is then fed to the low-pressure steam turbine 3L through the low-pressure main steam control valve 18 and the low-pressure main steam control valve lead pipe 18L.

The rotation speed setting value 101S output from the rotation speed setter 101 provided in the control circuit for low-pressure main steam control valve shown in FIG. 2 is zero before the stating procedure as described above. However, when the start-up is started, the rotation speed setting value 101S is increased at a comparatively slow rate toward the purge rotation speed as time advances. Since the gas turbine 1 has not yet reached the ignition operation at this time, the slow speed-up rate is allowed.

The PI controller 103 performs proportional integral calculation (PI calculation) until the shaft rotation speed 27S becomes equal to the rotation speed setting value 101S so as to output the instruction 103S, so that the valve opening degree instruction 106S outputted through the change rate limiter 105 and the upper limiter 106 increases so as to follow the rotation speed setting value 101S.

As a result, the low-pressure main steam control valve 18 feeds the auxiliary steam to the low-pressure steam turbine 3L while the valve opening degree thereof is controlled and starts rotating the low-pressure steam turbine 3L. That is, the shaft 5 (gas turbine 1) starts rotating.

The low-pressure main steam control valve 18 increases its valve opening degree so as to follow the rotation speed setting value 101S to increase the rotation speed of the gas turbine 1 to the purge rotation speed. Thus, the gas turbine 1 starts fuel purge operation and emits unburned fuel in an exhaust duct to the atmosphere before ignition. For the purpose of suppressing vibration of the bearings, the rotation speed setting value 101S is set to change in a sawtooth fashion during the fuel purge operation, so that the low-pressure main steam control valve 18 performs an operation, so-called "Wobulation operation", that increases and decreases the valve opening degree in a sawtooth fashion so as to follow the rotation speed setting value 101S.

After the fuel purge operation is performed for a predetermined time period, the rotation speed setter 101 once decreases the rotation speed setting value 101S before ignition of the gas turbine 1 so as to decrease the valve opening degree of the low-pressure main steam control valve 18 to thereby fully close the low-pressure main steam control valve 18. Then, at the time when the shaft rotation speed 27S of the gas turbine 1 is decreased to the ignition rotation speed, the gas turbine 1 is ignited.

After the ignition of the gas turbine 1, the rotation speed setter 101 increases the rotation speed setting value 101S in a stepwise manner toward the gas turbine self-sustained rotation speed, so that the PI controller 103 rapidly increases the value of the instruction 103S to rapidly increase the valve opening degree of the low-pressure main steam control valve 18, thereby increasing the rotation speed of the shaft 5 to a rotation speed allowing the self-sustained operation of the gas turbine 1. This is called speed-up control.

After the gas turbine 1 starts its self-sustained operation, the speed-up control need not be performed any more. However, in order to prevent the rotor blades of the low-pressure steam turbine 3L from being heated by a windage loss and contacting a stator part, cooling steam needs to be fed to the low-pressure steam turbine 3L.

The shaft rotation speed 27S becomes equal to or larger than the setting value 107S set in the self-sustained rotation speed setter 107 when the self-sustained operation of the gas turbine 1 is started, so that the switch instruction 108S is outputted from the comparator 108 to the first switch 104.

Upon reception of the switch instruction 108S, the first switch 104 switches the connection between terminals (a) and (c) denoted by a solid line to that between terminals (b) and (c) denoted by a broken line to select, as an input instruction, the instruction 116S of the PI controller 116 in place of the instruction 103S of the PI controller 103. Then, the first switch 104 outputs the instruction 104S.

Consequently, the control for the low-pressure main steam control valve 18 is switched from the speed-up control to a flow rate control to be described below.

The cooling steam flow rate setting value 113S set in the cooling steam flow rate setter 113 is set to a flow rate value required for cooling the low-pressure steam turbine 3L.

The subtractor 115 subtracts the flow rate 29S of the auxiliary steam passing through the low-pressure main steam control valve 18 from the cooling steam flow rate setting value 113S set to a flow rate value required for cooling the low-pressure steam turbine 3L and inputs the deviation 115S to the PI controller 116.

The PI controller 116 performs proportional integral calculation (PI calculation) for the deviation 115S such that the flow rate 29S of the auxiliary steam passing through the low-pressure main steam control valve 18 becomes equal to the cooling steam flow rate setting value 113S required for cooling the low-pressure steam turbine 3L, and outputs the calculation result as the cooling steam flow rate instruction 116S. As a result, the flow rate 29S of the auxiliary steam passing through the low-pressure main steam control valve 18 is controlled to a flow rate value required for cooling the low-pressure steam turbine 3L.

After the operation of the gas turbine 1 is shifted from the "speed increasing control" to "flow rate control", when the low-pressure steam generated in the low-pressure drum 11 of the exhaust heat recovery boiler 8A and superheated by the low-pressure superheater 12 reaches a predetermined steam pressure and sufficiently superheated to a temperature higher than the saturated steam temperature with the result that an adequate flow rate and adequate temperature of the low-pressure steam are achieved, the low-pressure steam isolation valve 17 is opened by a not shown drive unit. As a result, the auxiliary steam from the start-up boiler 22 and low-pressure steam from the low-pressure superheater 12 are mixed together at the portion of the low-pressure main steam pipe 16 on the upstream side of the low-pressure main steam control valve 18, and the mixed steam then flows into the low-pressure steam turbine 3L.

The change rate limiter 105 and the upper limiter 106 whose concepts have been described in FIG. 2 will be described below more specifically.

The rotation speed setting value 101S is increased in a stepwise manner after the ignition of the gas turbine 1, while the shaft rotation speed 27S of the shaft 5 cannot rapidly increase due to large inertia of the shaft 5. Therefore, in the subtractor 102, the deviation 102S between the rotation speed setting value 101S and the shaft rotation speed 27S is not zero until the shaft rotation speed 27S reaches the gas turbine self-sustained rotation speed setting value 107S. The deviation 102 reaches a largest value immediately after the stepwise increase of the rotation speed setting value 101S and then decreases as time advances.

Thus, the instruction 103S outputted from the PI controller 103 that performs proportional integral calculation for the deviation 102S rapidly becomes larger immediately after the stepwise increase of the rotation speed setting value 101S and is then inputted to the change rate limiter 105 through the first switch 104. Here, the change rate 118S smaller than the above change rate has been set in the change rate setter 118. Therefore, when the value of the instruction 103S outputted from the PI controller 103 is rapidly increased, the change rate limiter 105 limits the change rate limited signal 105S so as not to become larger than the change rate setting value 118S for output.

As a result, during a time period from the ignition of the gas turbine 1 until the shaft rotation speed 27S reaches the gas turbine self-sustained rotation speed setting value 107S, the low-pressure main steam control valve 18 is opened based on the change rate setting value 118S.

Then, when the valve opening degree of the low-pressure main steam control valve 18 is made to reach a value that can ensure a required steam flow rate by the upper limiter 106, the valve opening action of the low-pressure main steam control valve 18 is stopped, and the valve opening degree at that time is maintained.

The flow rate of the steam passing through the low-pressure main steam control valve 18 is detected by the detector 29 as the flow rate 29S and then inputted to the comparator 119.

The auxiliary steam flow rate required for generating the maximum drive torque of the low-pressure steam turbine 3L selected from drive torque range required in the speed-up phase of the gas turbine 1 is set in the auxiliary steam flow rate setter 120. As the valve opening degree of the low-pressure main steam control valve 18 is increased, the flow rate 29S of the auxiliary steam flowing through the low-pressure main steam control valve 18 is increased. When the auxiliary steam flow rate 29S becomes equal to or larger than the required flow rate setting value 120S, the stop instruction 119S is outputted from the comparator 119 and inputted to the upper limiter 106 as the upper limit value 119S.

The upper limiter 106 stops the increase of the valve opening degree instruction 106S at the upper limit value 119S. With this action, the low-pressure main steam control valve 18 stops its valve opening action when the valve opening degree thereof reaches a value that can ensure the required flow rate 120S, and maintains this valve opening degree.

The abovementioned change rate setting value 118S is set to a value allowing the low-pressure main steam control valve 18 to reach the valve opening degree, which can ensure the auxiliary steam flow rate required for the low-pressure steam turbine 3L before the time point at which the minimum required fuel flow rate for the gas turbine 1 to hold flame starts increasing after the ignition of the gas turbine 1. This will be described below more specifically.

FIG. 4 is a graph showing a relationship between the fuel flow rate and rotation speed during the start-up and speed-up phase of the gas turbine 1.

In the start-up and speed-up phase of the gas turbine 1, whichever larger is selected (that is, larger value selection is made) as the fuel flow rate, flow rate "a" or flow rate "b". Flow rate "a" is a "minimum required flow rate for flame holding" while keeping combustion, and flow rate "b" is a "flow rate required for ensuring necessary acceleration rate".

In the rotation speed region from immediately after the ignition of the gas turbine 1 during which the shaft rotation speed 27S is comparatively low, flow rate "a" is selected by which the "minimum required flow rate for flame holding" is secured while keeping combustion. After the operation according to the selected fuel flow rate "a" is continued for a certain period of time and when the shaft rotation speed 27S reaches a predetermined rotation speed (in FIG. 4, represented as "55% speed" of the rated speed for convenience of explanation) in the middle of the speed-up phase, flow rate "b" required for ensuring necessary acceleration rate is selected, and the fuel flow rate starts increasing.

If the opening of the low-pressure main steam control valve 18 is delayed due to an inappropriately small value of the change rate setting value 118S, a drive torque required by the low-pressure steam turbine 3L may not have achieved at the 55% speed. In such a case, the increase of the fuel flow rate for ensuring a necessary acceleration rate is started in the rotation speed region below the 55% speed.

There is no problem in a case where the increase of the fuel flow rate is performed in the high-speed rotation region (high air flow region) above the 55% speed. However, in the case where the increase of the fuel flow rate is started in the low speed rotation region (low air flow region) below the 55% speed, the temperature of the exhaust gas is increased to cause a possibility of breakage of the gas turbine 1.

Therefore, the low-pressure main steam control valve 18 needs to be opened with adequate rapidity so as to allow a drive torque required by the low-pressure steam turbine 3L to be generated before the shaft rotation speed 27S reaches the 55% speed. In other words, the change rate 118S of the low-pressure main steam control valve 18 needs to be set such that the low-pressure main steam control valve 18 reaches a valve opening degree that can ensure a flow rate required by the low-pressure steam turbine 3L before the time point at which the fuel flow rate for the gas turbine 1 starts increasing from the "minimum required flow rate for flame holding".

Next, specific calculation examples of the change rate setting value 118S and required flow rate setting value 120S will be described below.

The relationship between the shaft torque and the rotation speed during the start-up and speed-up phase of the gas turbine 1 will be described using FIG. 4 again.

The term "shaft torque" used here is a torque that needs to be fed to the gas turbine 1 from outside. Particularly, in the first embodiment, the shaft torque indicates a torque that is required to be obtained by the low-pressure steam turbine 3L at the start-up time.

The higher the rotation speed of the gas turbine 2, the larger the flow rate of air to be sucked by the gas turbine 2 becomes and hence the larger a required torque. Thus, as shown in FIG. 4, the shaft torque becomes larger as the rotation speed is increased and reaches a maximum value (set to 30 KN-m for convenience of explanation) at the time when the shaft rotation speed 27S reaches the 55% speed in the example of FIG. 4. After the time when the shaft rotation speed 27S reaches 55%, the fuel fed to the gas turbine 1 is increased to increase a torque generated in the gas turbine 1 itself. Accordingly, the shaft torque externally fed to the shaft 5 is gradually decreased and becomes zero when the rotation speed of the gas turbine 1 reaches the self-sustained rotation speed setting value 107S.

The auxiliary steam flow rate for generating the maximum drive torque (30 KN-m) required by the low-pressure steam turbine 3L is calculated as follows. That is, in terms of thermo dynamics, the steam turbine obeys the principle that the steam converts thermal energy into a torque while being expanded from the higher pressure stage to the lower pressure stage. Thus, a value of a torque generated when the auxiliary steam of a unit flow rate is expanded to the pressure (in general, about −96 kPa in gauge pressure) of a condenser is calculated, and then the maximum drive torque is divided by the calculated torque value, whereby the auxiliary steam flow rate is calculated.

For convenience of explanation, the auxiliary steam flow rate is set to 100 t/h and, in the first embodiment, the required flow rate setting value 120S is set to 100 t/h. As a modified method, in place of the above method in which the required flow rate setting value 120S is set to 100 t/h as a fixed value, the auxiliary steam flow rate for generating a drive torque required by the low-pressure steam turbine 3L may be set as the required flow rate setting value 120S. In such a method, the required flow rate setting value is varied in accordance with the rotation speed shown in FIG. 4. In the first embodiment, the auxiliary steam flow rate varying with the rotation speed is set to the maximum value, i.e., 100 t/h, so as to simplify the control circuit and increase the speed-up rate as much as possible.

As described above, the rotation speed is 55% at which "(b): the flow rate required for ensuring necessary acceleration rate" is selected, after the fuel flow rate for the gas turbine is increased from "(a): minimum required flow rate for flame holding". The low-pressure main steam control valve 18 is once fully closed and the auxiliary steam flow rate becomes zero at the ignition time of the gas turbine 1. The valve opening rate of the low-pressure main steam control valve 18 for ensuring the auxiliary steam flow rate (100 t/h) is calculated at the time point when the rotation speed reaches the 55% speed. That is, although the detail is omitted, the drive torque (increased from 0 N-m to 30 KN-m in a ramp-like fashion) and the torque generated by the gas turbine 1 are added, and the acceleration rate of the gas turbine 1 achieved by the added torque is calculated using a convergence calculation program (note that the auxiliary steam pressure is calculated as the first pressure).

For convenience of explanation, the above valve opening rate is set to 20%/min. In order to ensure some margin, the actual change rate setting value 118S is set to a value faster (larger) than the slowest (smallest) valve opening rate allowing for the 20%/min. However, it should be noted that in the case where the actual change rate setting value 118S is set to a quite larger value, the start-up boiler 22 or other equipment serving as an auxiliary steam supply source cannot follow the valve opening operation.

Next, the first pressure instruction value 201S and the second pressure instruction value 202S whose outlines have been described will be described in more detail with reference to FIGS. 3 and 4.

As described above, in the control circuit for the auxiliary steam flow control valve 25, the second switch 203 can switch between two steam pressure setting values. Therefore, the second switch 203 can be referred to as "steam pressure switch".

Further, as described above, the first pressure setting value 201S is a pressure value at which the low-pressure main steam control valve 18 is not fully opened even when the auxiliary steam for generating the maximum drive torque of the low-pressure steam turbine 3L required for speed-up of the gas turbine 1 flows in the low-pressure main steam control valve 18. More specifically, as the first pressure setting value 201S, a comparatively high value is selected at which the low-pressure main steam control valve 18 is not fully opened even when the auxiliary steam of 100 t/h flows in the auxiliary steam flow control valve 25. The value of the second pressure instruction 202S is a pressure value at which both the low-pressure steam and the auxiliary steam can be fed to the low-pressure steam turbine 3L through the low-pressure main steam control valve 18.

In FIG. 4, the maximum drive torque of the low-pressure steam turbine 3L is 30 KN-m, and the auxiliary steam flow rate for generating this maximum drive torque is 100 t/h.

In the case where the first pressure setting value 201S is set to an inappropriately low value, the volume flow of the auxiliary steam for ensuring 100 t/h becomes larger to cause the low-pressure main steam control valve 18 to be fully opened before ensuring of 100 t/h with the result that a torque shortage occurs. By setting the maximum drive torque of the low-pressure steam turbine 3L and the auxiliary steam flow rate for generating this maximum drive torque to the above values, inconvenience of the occurrence of the torque shortage can be avoided.

A relationship among the valve opening degree, valve differential pressure and flow rate of the low-pressure main steam control valve 18 is presented in a characteristic curve provided by the steam valve manufacturer. Thus, by assigning an auxiliary steam pressure (valve primary pressure: 0.7 MPa) generated by the start-up boiler 22 to the characteristic curve, it is possible to calculate a valve secondary pressure, i.e., the first pressure setting value 201S, that can ensure a flow rate of 100 t/h when the low-pressure main steam control valve 18 is fully opened. In order to ensure some margin, the actual first pressure setting value 201S is set to a value that can ensure a flow rate of 100 t/h when the low-pressure main steam control valve 18 is opened by about 70 to 80%. Here, for convenience of explanation, the first pressure setting value 201S is set to 0.6 MPa.

Adoption of such a comparatively high-pressure allows the Wobulation operation to be performed with satisfactory controllability. That is, at the time of the fuel purge operation of the gas turbine 1, the auxiliary steam flow rate is naturally smaller than 100 t/h since the shaft rotation speed 27S is low, and the valve opening degree of the low-pressure main steam control valve 18 is about 20% to 30%.

As described above, the value of the second pressure instruction 202S is a pressure value at which both the low-pressure steam and auxiliary steam can be fed to the low-pressure steam turbine 3L through the low-pressure main steam control valve 18. The reason will be described below.

As described above, after the gas turbine 1 starts its self-sustained operation, the control for the low-pressure main steam control valve 18 is switched to the flow rate control intended for supply of the low-pressure turbine cooling steam. After that, at the time point when the flow rate and temperature of the low-pressure steam generated from the low-pressure drum 11 become adequate values, the low-pressure steam isolation valve 17 is opened. If the auxiliary steam of a pressure (0.6 MPa: first pressure setting value 201S) higher than low-pressure steam (about 0.3 MPa) flows in the low-pressure main steam control valve 18, inconvenience that the low-pressure steam does not flow in the low-pressure main steam control valve 18 would occur. In such a case, the pressure of the low-pressure drum 11 would be extremely increased relative to a planned heat balance. In order to evade such a case, the pressure of the auxiliary steam is switched to the second pressure setting value 202S for pressure reduction so as not to interfere with the parallel supply.

As described above, in the first embodiment, the second pressure setting value 202S is calculated as follows. The added value 208S of the pressure 28S of the low-pressure drum 11 detected by the detector 28 and bias value 207S set in the bias pressure setter 207 is inputted to the memory 202. The memory 202 stores the added value 208S at the moment when the gas turbine 1 is ignited and outputs it as the second pressure setting value 202S.

Afterward, even when the pressure 28S of the low-pressure drum 11 is increased along with the progress of the start-up phase, the value which is calculated from the pressure 28S of the low-pressure drum 11 and the bias value 207S at the moment when the gas turbine 1 is ignited is maintained as the second pressure setting value 202S.

The bias value 207S is small and is set for avoiding adverse affect (e.g., full close of the auxiliary steam flow control valve 25) occurring when the auxiliary steam and the low-pressure steam maintain exactly the same pressure value for a long time period. Thus, the stored second pressure setting value 202S can be regarded as a low value substantially equal to the pressure of the low-pressure steam generated in the low-pressure drum 11.

Since the second pressure setting value 202S outputted from the memory 202 is set to a low value substantially equal to the pressure of the low-pressure steam generated in the low-pressure drum 11 as described above, it is possible to allow the auxiliary steam from the start-up boiler 22 and the low-pressure steam from the low-pressure drum 11 to flow in the low-pressure main steam control valve 18.

Afterward, input heat is accumulated along with the progress of the start-up phase and, accordingly, the pressure 28S (pressure of the low-pressure steam) of the low-pressure drum 11 is gradually increased and eventually exceeds the second pressure setting value 202S. Along with this increase, the auxiliary steam flow control valve 25 is gradually closed and, eventually, the entire cooling steam to be fed to the low-pressure steam turbine 3L is supplied by the low-pressure steam.

The switching operation from the first pressure setting value 201S to the second pressure setting value 202S in conducted as follows. The second switch 203 selects the first pressure setting value 201S at the time point when the fuel purge operation and ignition of the gas turbine 1 are performed, and it selects the second pressure setting value 202S when the rotation speed of the gas turbine 1 is higher than a rotation speed at which the maximum drive torque is required for the low-pressure steam turbine 3L to achieve the speed-up of the gas turbine 1 and lower than a rotation speed allowing the self-sustained operation of the gas turbine 1.

When the shaft rotation speed 27S reaches the switching rotation speed setting value 210S, the comparator 211 outputs the switch instruction 211S to the second switch 203 to make the second switch 203 turn from the first pressure setting value 201S to the second pressure setting value 202S for preparation of the subsequent parallel supply of auxiliary steam and the low-pressure steam from the low-pressure drum 11.

During the operation for ensuring the auxiliary steam of 100 t/h under the first pressure setting value 201S, the valve opening degree of the low-pressure main steam control valve 18 is set in the range of 70% to 80%. At this time, since the second pressure setting value 202S is lower than the first pressure setting value 201S, the volume flow rate of the auxiliary steam may be increased to increase the valve opening degree of the low-pressure main steam control valve 18. In the control circuit of FIG. 2, the stop instruction 119S outputted from the comparator 119 is turned off to release the upper limit of the upper limiter 106 with the result that the value of the valve opening degree instruction 106S is increased to increase the valve opening degree of the low-pressure main steam control valve 18. In such a case, the low-pressure main steam control valve 18 may possibly become fully opened.

However, in the first embodiment, the pressure setting value is switched from the first pressure setting value 201S to the second pressure setting value 202S in the rotation speed region higher than the 55% speed. Therefore, a torque generated by the combustion gas of the gas turbine 1 is gradually increased in the high rotation speed region as shown in FIG. 4 and, in response to the increase of the torque, a torque required by the low-pressure steam turbine 3L is decreased, and whereby the auxiliary steam flow rate of 100 t/h is no longer required. If, as a worst-case scenario, the low-pressure main steam control valve 18 is fully opened as a result of the switching of the pressure setting value to the second pressure setting value 202S to decrease the auxiliary steam flow rate to a level equal to or less than 100 t/h, a serious problem does not occur although the time span required for the speed-up phase to be completed gets longer.

A torque required by the low-pressure steam turbine 3L becomes smaller as the rotation speed is increased as shown in FIG. 4. Therefore, it may be better to set the switching rotation speed setting value 210S to a higher value and to switch the pressure setting value to the second pressure setting value 202S at the set switching rotation speed setting value 210S. However, since the parallel supply of the auxiliary steam and the low-pressure steam is started at the self-sustained rotation speed of the gas turbine 1, it is necessary to set the switching rotation speed setting value 210S to a value lower than the self-sustained rotation speed.

Modification of First Embodiment

Figure 5:
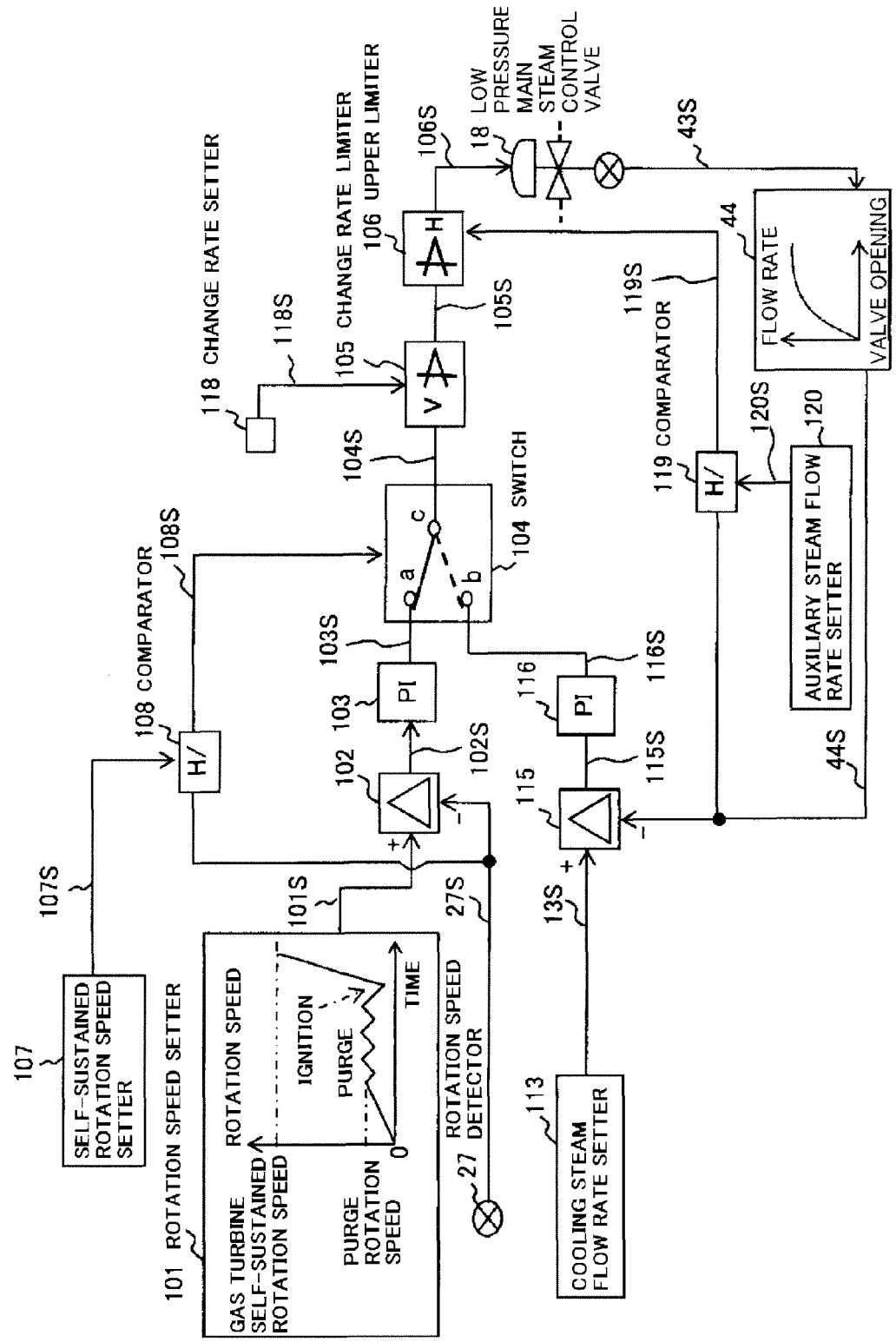
FIG. 5 is a configuration diagram showing a modification of the control circuit for low-pressure main steam control valve of FIG. 2.

Although the flow rate of the steam passing through the low-pressure main steam control valve 18 is directly detected using the flow rate detector (flow rate transmitter) 29 in the first embodiment described above, the present invention is not limited to this. For example, as shown in FIG. 5, a configuration may be employed in which the valve opening degree of the low-pressure main steam control valve 18 is detected by a valve opening degree detector (valve opening degree sensor) 43, and the detected valve opening degree signal 43S is inputted to a function generator 44. In the function generator 44, a relationship between the valve opening degree 43S and the flow rate 44S is set in advance and calibrated. Then, the function generator 44 can calculate the flow rate of the steam passing through the low-pressure main steam control valve 18 in an indirect manner.

(Second Embodiment)

Figure 6:
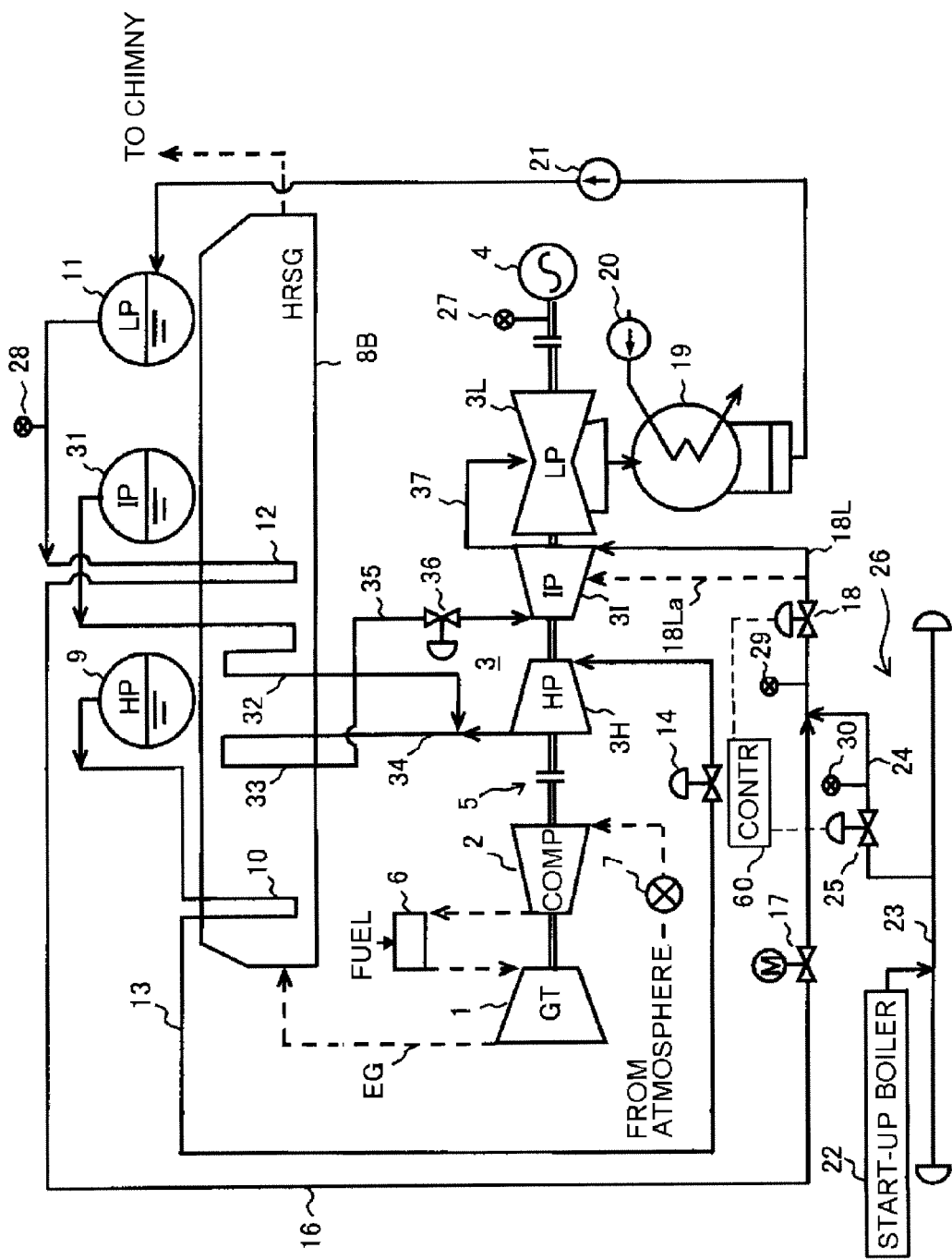
FIG. 6 is a system diagram showing the main part of the single shaft combined cycle power plant according to a second embodiment of the present invention.

FIG. 6 is a system diagram showing the main part of the single shaft combined cycle power plant according to a second embodiment of the present invention.

The first embodiment is a single shaft combined cycle power plant constituted by two-pressure with high and low steam system pressures; while the second embodiment is a single shaft combined cycle power plant constituted by three-pressure with high, intermediate and low steam system pressures.

As shown in FIG. 6, as compared to the exhaust heat recovery boiler (HRSG) 8A of FIG. 1, an exhaust heat recovery boiler (HRSG) 8B according to the second embodiment further includes an intermediate pressure drum 31 that generates intermediate pressure steam having a pressure value lower than that of the high-pressure steam and higher than that of the lower pressure steam. The HRSG 8b also includes an intermediate pressure superheater 32 that superheats the intermediate pressure steam generated in the intermediate pressure drum 31, and a reheater 33 that generates high temperature reheat steam.

The steam turbine 3 of the second embodiment further includes an intermediate pressure steam turbine 3I that is coaxially arranged with the high-pressure steam turbine 3H and low-pressure steam turbine 3L and driven by the high temperature reheat steam from the reheater 33.

The steam turbine 3 further includes a low temperature reheat steam pipe 34 that feeds exhaust steam from the high-pressure steam turbine 3H to the reheater 33 together with the intermediate pressure steam. The steam turbine 3 further includes a high temperature reheat steam pipe 35 that leads the high temperature reheat steam reheated by the reheater 33 to the intermediate pressure steam turbine 3I. The steam turbine 3 further includes a reheat control valve 36 that is provided in the middle of the high temperature reheat steam pipe 35 and controls the flow rate of the reheat steam. The steam turbine 3 further includes a cross-over pipe 37 that leads exhaust steam from the intermediate pressure steam turbine 3I to the low-pressure steam turbine 3L.

Furthermore, the steam turbine 3 includes a low-pressure main steam control valve lead pipe 18L that introduces low-pressure steam passing from the low-pressure main steam control valve 18 into the last stage of the intermediate pressure steam turbine 3I as denoted by a solid line. Alternatively, the steam turbine 3 may includes a low-pressure main steam control valve lead pipe 18La that introduces the low-pressure steam passing from the low-pressure main steam control valve 18 into an intermediate stage of the intermediate pressure steam turbine 3I near the outlet thereof, as denoted by a dotted line in FIG. 6.

The low-pressure steam introduced into the last stage or near-outlet intermediate stage of the intermediate pressure steam turbine 3I by the low-pressure main steam control valve lead pipe 18L or 18La is mixed with steam whose pressure has been reduced by adiabatic expansion in the casing of the intermediate pressure steam turbine 3I to become low-pressure turbine steam.

In the second embodiment, in a low pressure turbine steam system, the low-pressure steam superheated by the low-pressure superheater 12 is fed to the last stage or near-outlet intermediate stage of the intermediate pressure steam turbine 3I through the low pressure main steam pipe 16, the low pressure main steam control valve 18 and the low pressure main steam control valve lead pipe 18L or 18La and then is fed to the low-pressure steam turbine 3L through the crossover pipe.

Same reference numerals are assigned to other devices or pipes that are the same as those in FIG. 1, and overlapping descriptions thereof are omitted.

As described above, the start-up method that uses the low-pressure steam turbine 3L to increase the rotation speed up to a value allowing the self-sustained operation of the gas turbine 1 can also be applied to the single shaft combined cycle power plant of the second embodiment constituted by a three-pressure steam system.

(Third Embodiment)

Figure 7:
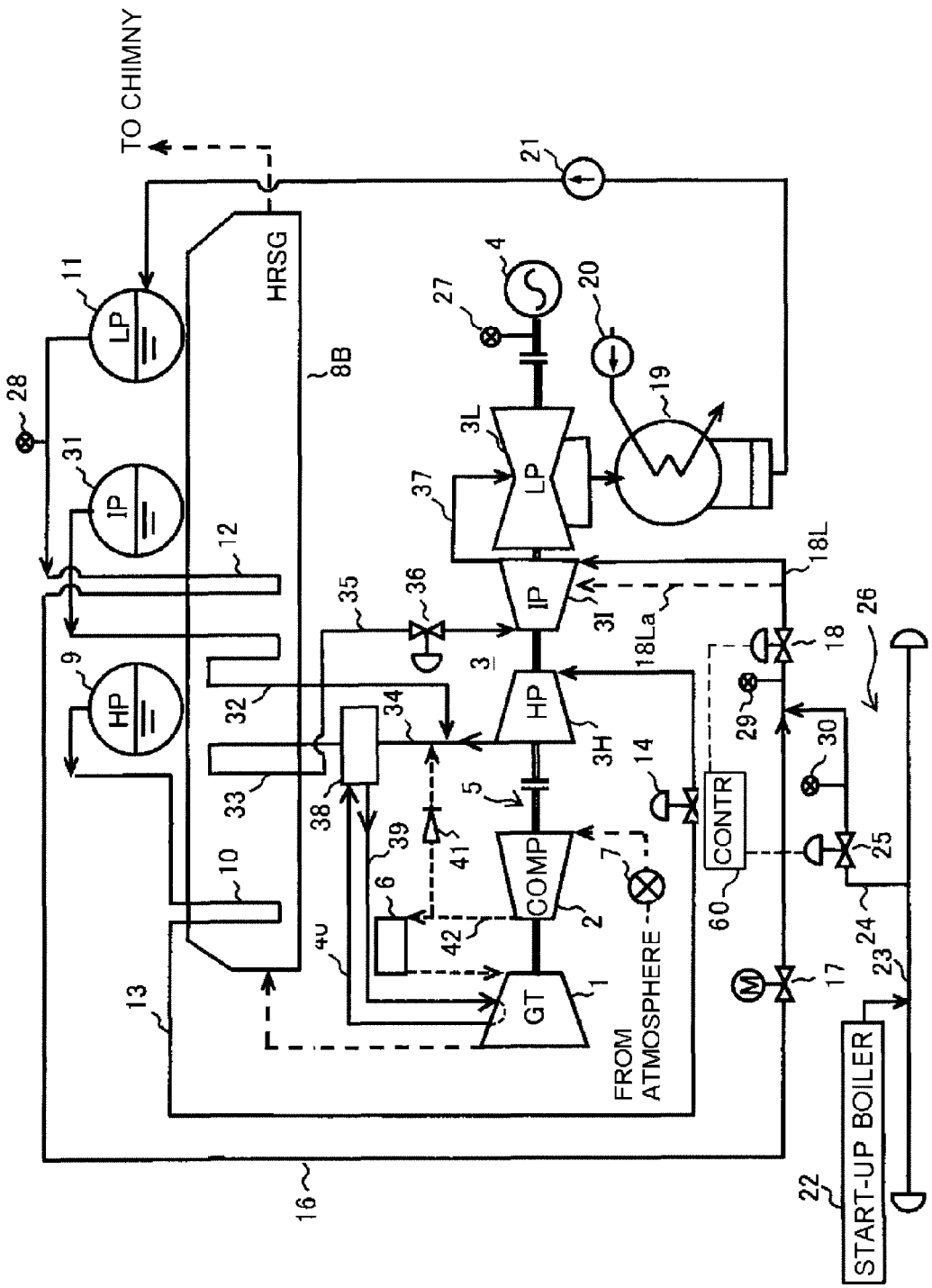
FIG. 7 is a system diagram showing the main part of the single shaft combined cycle power plant according to a third embodiment of the present invention.

FIG. 7 is a system diagram showing the main part of the single shaft combined cycle power plant according to a third embodiment of the present invention.

In the second embodiment shown in FIG. 6, the high temperature part of the gas turbine 1, such as the stator blades or rotor blades, is not cooled especially by cooling medium. On the other hand, in the third embodiment, a so-called steam cooling method that cools the high temperature part of the gas turbine 1, such as the stator blades or rotor blades, by steam is adopted.

In the system diagram of FIG. 7 showing the main part of the single shaft combined cycle power plant, a gas turbine cooling unit 38 for cooling the high temperature part of the gas turbine 1, such as the stator blades or rotor blades, is provided between the low temperature reheat system 34 and the reheater 33. Steam in the gas turbine cooling unit 38 is led to the high temperature part of the gas turbine 1, such as the stator blades or rotor blades, by a steam forward-flow pipe 39 to cool the high temperature part. The steam is then returned to the gas turbine cooling unit 38 by a returning steam flow pipe 40.

Air discharged from the gas turbine compressor 2 is configured to be fed to the low temperature reheat system 34 by an air pipe 42 having a check valve 41 at the intermediate portion thereof. Same reference numerals are assigned to other devices or pipes that are the same as those in FIG. 6, and overlapping descriptions thereof are omitted.

In the third embodiment, during the start-up and speed-up phase of the gas turbine 1, discharged air from the gas turbine compressor 2 is fed to the gas turbine cooling unit 38 through the air pipe 42 having the check valve 41. Thus, air cooling operation (air cooling mode operation) in which the high temperature part of the gas turbine 1 is cooled by air is achieved. When the start-up phase advances to a phase where steam is fed from the exhaust heat recovery boiler 8B to the high-pressure steam turbine 3H to generate exhaust steam, the check valve 41 is closed at the time point when the pressure of the exhaust steam of the high-pressure steam turbine 3H becomes higher than the pressure of the discharged air of the gas turbine compressor 2 to stop the supply of the discharged air. Then, the exhaust steam of the high-pressure steam turbine 3H flows in the cooling steam system 38 in place of the discharged air. Thus, steam cooling operation (steam cooling mode operation) is achieved where the high temperature part of the gas turbine 1 is cooled by steam.

As described above, according to the third embodiment, the start-up method that uses the low-pressure steam turbine 3L to increase the rotation speed up to a value allowing the self-sustained operation of the gas turbine 1 can be applied to the single shaft combined cycle power plant adopting the steam cooling method for cooling the high temperature part of the gas turbine 1.

(Fourth Embodiment)

Before a description of the fourth embodiment using the drawings, a problem to be solved by the present embodiment will be described.

As described above, during the start-up phase of the single shaft combined cycle power plant, the rotation speed is decreased from the purge rotation speed to the ignition rotation speed immediately before the ignition of the gas turbine. Thus, it is necessary to fully close the low-pressure main steam control valve once and then to drive and speed up the shaft 5 at a high acceleration rate after the ignition of the gas turbine in order to keep an adequate combustion state. Therefore, during the start-up phase of the power plant, the low-pressure main steam control valve is rapidly opened from full-closed state to a large opening degree.

The start-up boiler is forced to undergo a rapid load increase so as to generate a substantially maximum flow rate of steam in a short time period (in a range of about two to three minutes) from an operation state with minimum steam flow rate in order to follow the valve opening degree of the low-pressure main steam control valve. However, in general, the start-up boiler is not designed to respond to such a rapid load increase and, thus, it is difficult to control the start-up boiler to follow the rapid valve opening operation of the low-pressure main steam control valve.

In order to solve the above problem, the fourth embodiment intends to provide a single shaft combined cycle power plant and its start-up method that generates a required flow rate of steam for the self-sustained operation of the gas turbine before start-up of the single shaft combined cycle power plant, so as to allow start-up to be performed with a load on the start-up boiler after the start of the shaft speed-up phase kept constant, that is, without being accompanied by a load rise or fall.

The fourth embodiment will be described in detail below with reference to the drawings.

Figure 8:
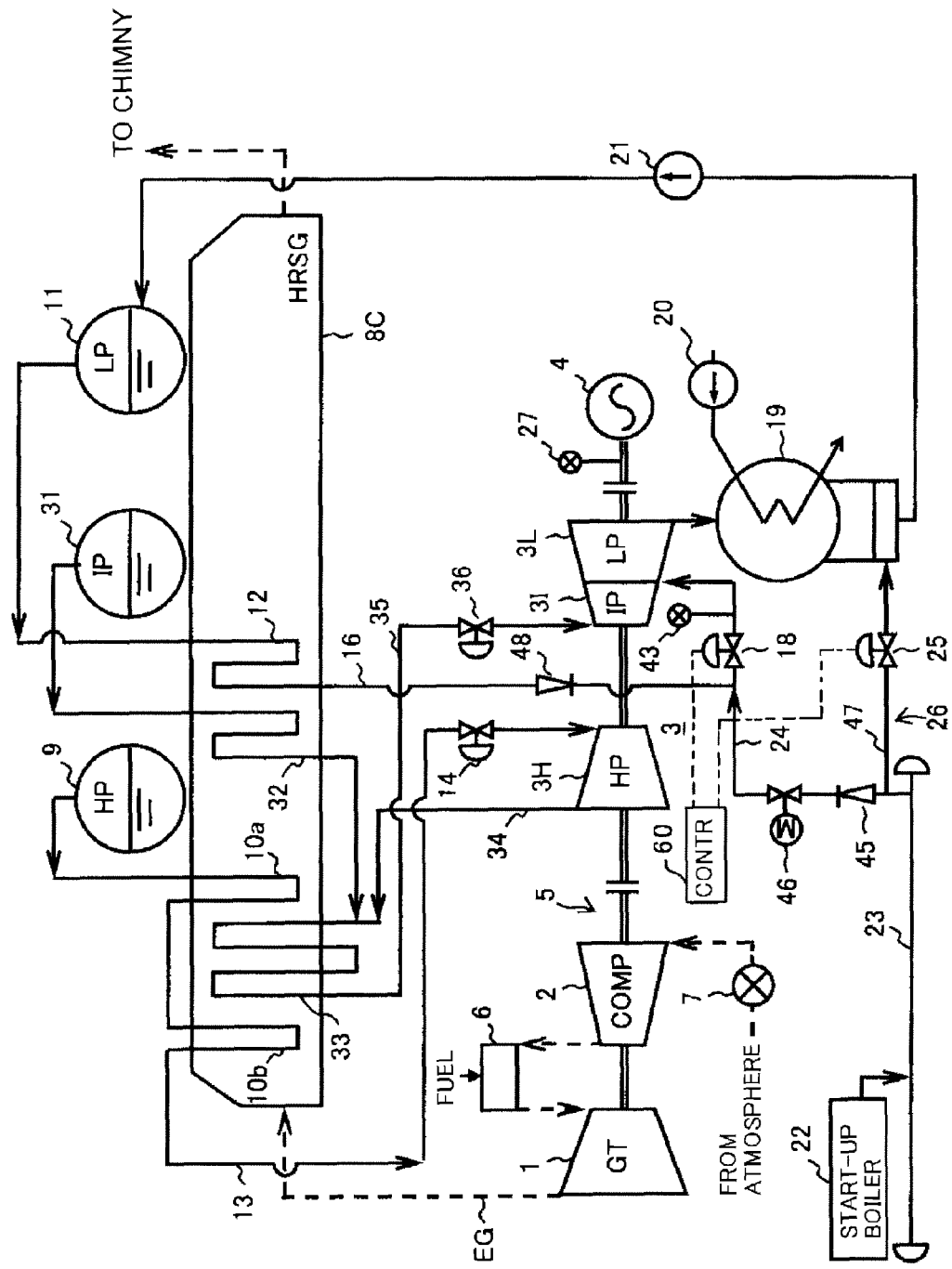
FIG. 8 is a system diagram showing the main part of the single shaft combined cycle power plant according to a fourth embodiment of the present invention.
Figure 9:
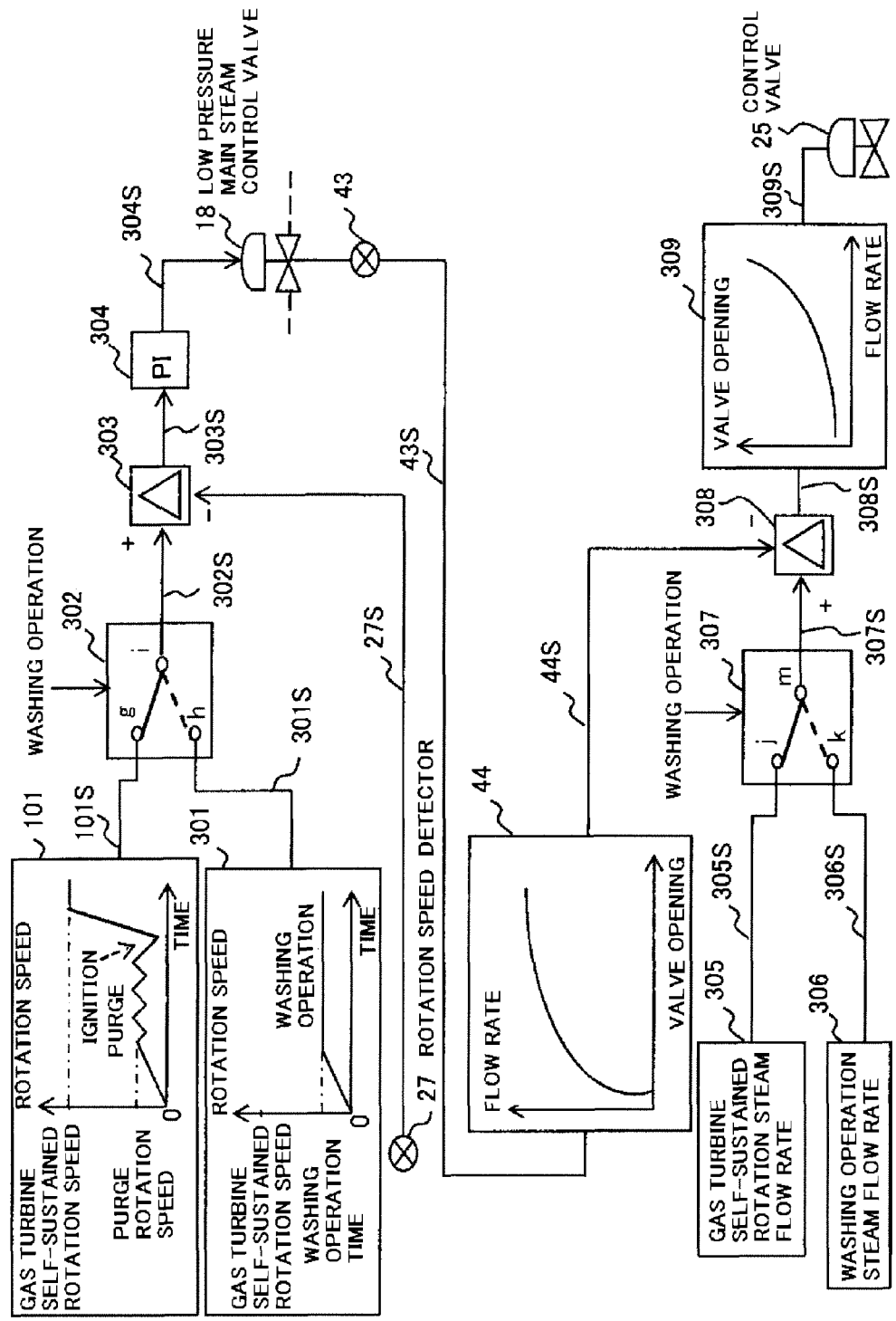
FIG. 9 is a diagram showing an example of a control circuit of a low-pressure main steam control valve and an auxiliary steam flow control valve provided in the start-up controller according to the fourth and the fifth embodiments of the present invention.

FIG. 8 is a system diagram showing the main part of the single shaft combined cycle power plant according to the fourth embodiment of the present invention. FIG. 9 is a control circuit diagram showing the low-pressure main steam control valve and the auxiliary steam flow control valve provided in the start-up controller 60.

The single shaft combined cycle power plant of FIG. 8 has an exhaust heat recovery boiler 8C that adopts a three-pressure (high, intermediate and low pressure) steam system as in the second and third embodiments. As a matter of course, however, the single shaft combined cycle power plant of the present embodiment may be constituted by a two-pressure (high and low pressure) steam system as in the first embodiment.

Hereinafter, descriptions of the parts overlapping the previous embodiments are omitted, and newly added parts will be intensively described.

The fourth embodiment differs from the second and the third embodiments in the configurations of the exhaust heat recovery boiler 8C and the start-up time auxiliary steam supply pipe 26 so as to cope with the abovementioned problem.

In the exhaust heat recovery boiler 8C of the fourth embodiment, the high-pressure superheater 10 is divided into a first high-pressure superheater 10a and a second high-pressure superheater 10b. In this configuration, steam generated in the high-pressure drum 9 is sequentially superheated by the first high-pressure superheater 10a and the second high-pressure superheater 10b, and is discharged through the high-pressure steam pipe 13.

The start-up time auxiliary steam supply pipe 26 has the following configuration.

That is, the start-up time auxiliary steam supply pipe 26 is constituted by an auxiliary steam supply main pipe 23 connected to the start-up boiler 22, auxiliary steam supply branch pipe 24, and a bypass pipe 47. One end of the auxiliary steam supply branch pipe 24 is connected to the auxiliary steam supply main pipe 23 and the other end thereof is connected to the upstream side of the low-pressure main steam control valve 18. In the middle of the auxiliary steam supply branch pipe 24, a check valve 45 and a cooling steam check valve 46 are provided. One end of the bypass pipe 47 is connected to the upstream side of the check valve 45 and the other end thereof is connected to the condenser 19. In the middle of the bypass pipe 47, an auxiliary steam flow control valve 25 for controlling the auxiliary steam flow rate at the start-up time is provided.

The fourth embodiment further differs from the above embodiments in that a check valve 48 is provided, in place of the low-pressure steam isolation valve 17, in the low-pressure main steam pipe 16 at the upstream side relative to the joining point between the low-pressure main steam pipe 16 and the auxiliary steam supply branch pipe 24.

The fourth embodiment adopts the same start-up technique as the first to third embodiments. That is, steam generated from the start-up boiler 22 is fed to the low-pressure steam turbine 3L through the low-pressure main steam control valve 18 so as to drive the low-pressure steam turbine 3L, thereby speeding up the shaft 5.

In this start-up technique, the start-up boiler 22 generates a required flow rate of steam for increasing the rotation speed of the shaft 5 to a rotation speed allowing the self-sustained operation of the gas turbine 1 before the speed-up of the shaft 5 is started, and the generated steam is allowed to flow in the condenser 19 through the bypass pipe 47 and the auxiliary steam flow control valve 25. When the auxiliary steam is fed to the low-pressure main steam control valve 18 during the speed-up phase, the auxiliary steam flow control valve 25 is controlled such that the sum of the flow rates of steam passing through the low-pressure main steam control valve 18 and the auxiliary steam flow control valve 25 is equal to the flow rate of steam required for increasing the rotation speed of the shaft 5 to the rotation speed allowing the self-sustained operation.

Next, with reference to FIG. 9, a control circuit for the low-pressure main steam control valve and the auxiliary steam flow control valve provided in the start-up controller 60 will be described.

Reference numeral 101 denotes a rotation speed setter that sets a rotation speed at the normal start-up operation of the gas turbine 1. The rotation speed setter 101 of the present embodiment has the same configuration as the rotation speed setter of FIG. 2 for normal start-up of the gas turbine 1. That is, the rotation speed setting value 101S required in the normal start-up of the gas turbine 1 is set with respect to elapsed time (horizontal axis) from the start of the start-up phase in advance.

Reference numeral 301 denotes a washing operation rotation speed setter in which the shaft rotation speed required in a gas turbine compressor washing operation is set in advance as a setting value 301S with respect to elapsed time (horizontal axis) from the start of the start-up phase. The gas turbine compressor washing operation is one example of a non-ignition speed-up operation in which the shaft rotation speed is increased to a predetermined rotation speed without involving the gas turbine ignition.

Reference numeral 302 denotes a third switch that performs switching of input terminals depending on whether "normal start-up operation" or "gas turbine compressor washing operation" is selected as an operation mode of the gas turbine 1. In the case where the "normal start-up operation" has been selected, the third switch 302 connects input terminals (g) and (i) as denoted by a solid line and outputs the shaft rotation speed setting value 101S at the normal start-up operation time as an output instruction 302S. In the case where the "gas turbine compressor washing operation" has been selected, the third switch 302 connects input terminals (h) and (i) and outputs the shaft rotation speed setting value 301S at the gas turbine compressor washing operation time as the output instruction 302S.

Reference numeral 303 denotes a subtractor that receives as an input the output instruction 302S of the third switch 302 and the shaft rotation speed 27S of the rotation speed detector 27 and subtracts the shaft rotation speed 27S of the rotation speed detector 27 from the output instruction 302S to output a deviation 303S. Reference numeral 304 denotes a PI controller that receives as an input the deviation 303S, performs proportional integral calculation (PI calculation) such that the shaft rotation speed 27S of the gas turbine 1 becomes equal to the output instruction 302S, and outputs the calculation result to the low-pressure main steam control valve 18 as a valve opening degree instruction 304S.

Reference numerals 43 and 44 denote a valve opening degree sensor and a function generator respectively. They have the same configurations as those shown in FIG. 5, and output the valve opening degree signal 43S and flow rate signal 44S, respectively.

Reference numeral 305 denotes a self-sustained rotation steam flow rate setter for setting the steam flow rate for the self-sustained rotation of the gas turbine 1. The self-sustained rotation steam flow rate setter 305 outputs a steam flow rate instruction 305S indicating the value of a flow rate required for the self-sustained rotation at the time of start-up in the normal start-up operation.

Reference numeral 306 denotes a setter that sets the steam flow rate for the gas turbine compressor washing operation. Reference numeral 307 denotes a fourth switch. Like the abovementioned third switch 302, the fourth switch 307 is configured to switch input terminals depending on whether "normal start-up operation" or "gas turbine compressor washing operation" is selected as an operation mode of the gas turbine 1. In the case where the "normal start-up operation" has been selected as the operation mode of the shaft 5, the fourth switch 307 connects terminals (j) and (m) as denoted by a solid line in conjunction with the third switch 302, and outputs the gas turbine self-sustained rotation steam flow rate setting value 305S as an output instruction 307S. In the case where the "gas turbine compressor washing operation" has been selected, the fourth switch 307 connects input terminals (k) and (m), and outputs steam flow rate setting value 306S at the gas turbine compressor washing operation time as an output instruction 307S.

Reference numeral 308 denotes a subtractor that receives as an input the output instruction 307S of the fourth switch 307 and the output 44S of the function generator 44, and subtracts the output 44S corresponding to the flow rate of steam passing through the low-pressure main control valve from the output instruction 307S to output a deviation as a steam flow rate instruction 308S.

Reference numeral 309 denotes a function generator in which a relationship between the input steam flow rate instruction and the valve opening degree instruction to be outputted is set in advance. The function generator 309 outputs a valve opening degree instruction 309S corresponding to the deviation 308S inputted from the subtractor 308 to a not shown drive unit of the auxiliary steam flow control valve 25.

Next, with reference to FIGS. 8 and 9, control of the low-pressure main steam control valve 18 and the auxiliary steam flow control valve 25 in the fourth embodiment will be described.

[1] Normal Start-up Operation Period

The start-up boiler 22 is made to be in operation before a start-up instruction is sent out to the combined cycle power plant so as to generate a required flow rate of steam in advance. That is, the steam flow rate instruction 305S indicating the value of a flow rate required for the self-sustained rotation of the gas turbine 1 has been outputted from the self-sustained rotation steam flow rate setter 305. The low-pressure main steam control valve 18 is in a full closed state before the output of a start-up instruction is issued. Accordingly, the valve opening degree signal 43S of the low-pressure main steam control valve 18 detected by the valve opening degree sensor 43 is zero. Therefore, the flow rate 44S of the steam passing through the low-pressure main steam control valve 18 outputted from the function generator 44 is also zero, naturally.

First, focusing on the auxiliary steam flow control valve 25, the steam flow rate instruction 305S indicating the value of a flow rate required for the self-sustained rotation of the gas turbine 1 is inputted to the subtractor 308 through the fourth switch 307. The flow rate 44S of the steam passing through the low-pressure main steam control valve 18, which is the other input signal of the subtractor 308, is still zero, so that a deviation outputted from the subtractor 308, that is, the auxiliary steam flow control valve flow rate setting instruction 308S is the maximum value which is equal to the gas turbine self-sustained rotation steam flow rate setting value 305S.

The function generator 309 outputs the valve opening degree instruction 309S corresponding to the auxiliary steam flow control valve flow rate setting instruction 308S, so that the auxiliary steam flow control valve 25 starts opening to the maximum valve opening degree corresponding to the valve opening degree instruction 309S. As described above, at the time point when a start-up instruction is sent out, all the auxiliary steam fed from the start-up boiler 22 to the auxiliary steam supply main pipe 23 passes through the auxiliary steam flow control valve 25 provided in the bypass pipe 47, and flows in the condenser 19.

When the normal start-up operation has been selected, the third switch 302 connects the terminals (g) and (i), so that the gas turbine self-sustained rotation speed setting instruction value 101S is inputted to one input terminal of the subtractor 303. At this time, the shaft 5 has not been activated. Accordingly, the shaft rotation speed 27S is zero, and the deviation 303S, that is, the gas turbine self-sustained rotation speed setting instruction value 101S outputted from the subtractor 303 is inputted to the PI controller 304. The PI controller 304 performs proportional integral calculation (PI calculation) for the deviation 303S and gives the valve opening degree instruction 304S to a not shown drive unit of the low-pressure main steam control valve 18 such that the rotation speed signal 27S of the shaft 5 becomes equal to the gas turbine self-sustained rotation speed setting instruction value 101S. As a result, the low-pressure main steam control valve 18 starts opening. Upon the start of the low-pressure main steam control valve 18, part of the auxiliary steam generated from the start-up boiler 22 starts being fed to the low-pressure steam turbine 3L and, correspondingly, the flow rate of the auxiliary steam flowing in the condenser 19 is reduced.

As time elapses after the start-up, the rotation speed setting value 101S is gradually increased with the result that the rotation speed of the shaft 5 starts increasing. Then, the flow rate 43S of the steam passing through the low-pressure main steam control valve 18 is increased and thereby the signal 44S increased. Thus, the deviation 308S, that is, the auxiliary steam flow control valve flow rate instruction 308S of the subtractor 308 is decreased. The decrease in the auxiliary steam flow control valve flow rate instruction 308S reduces the valve opening degree of the auxiliary steam flow control valve 25. Then, the flow rate of the auxiliary steam to be fed to the condenser 19 through the auxiliary steam flow control valve 25 of the bypass pipe 47 is reduced by the flow rate corresponding to the reduction in the valve opening degree.

Thereafter, the rotation of the shaft 5 follows the gas turbine self-sustained rotation speed setting instruction value 101S, and the rotation speed thereof is increased up to the purge rotation speed. After a predetermined purge time has elapsed, the gas turbine normal start-up rotation speed setter 101 once decreases and then increases at a rapid rate the shaft rotation speed setting value 101S toward the gas turbine self-sustained rotation speed for ignition of the gas turbine 1.

Accordingly, the PI controller 304 increases the value of the valve opening degree instruction 304S such that the shaft rotation speed 27S becomes equal to the shaft rotation speed setting value 101S to thereby increase the valve opening degree of the low-pressure main steam control valve 18. Thus, a large flow rate of auxiliary steam is fed to the low-pressure steam turbine 3L and, eventually, the rotation speed of the shaft 5 reaches a rotation speed allowing the self-sustained operation of the gas turbine 1.

When the flow rate of the auxiliary steam passing through the low-pressure main steam control valve 18 is increased, the value of the signal 44S is increased. Thus, the deviation 308S of the subtractor 308 is more and more decreased. When the rotation speed of the shaft 5 is increased up to a rotation speed requiring the maximum drive torque of the gas turbine 1, the auxiliary steam flow control valve 25 is fully closed. Then, all the auxiliary steam is fed to the low-pressure steam turbine 3L.

In general, when the rotation speed of the gas turbine 1 is increased at a rapid rate toward the gas turbine self-sustained rotation speed after the ignition of the gas turbine 1, the valve opening degree of the low-pressure main steam control valve 18 is rapidly increased and thus the steam fed from the start-up boiler 22 is rapidly consumed. However, the start-up boiler 22 is not designed to respond to such a rapid load increase and it is difficult to control the start-up boiler 22 to follow the rapid valve opening operation, resulting in shortage of the steam flow rate, whereby a required acceleration rate cannot be obtained.

However, in the fourth embodiment, the start-up boiler is made to complete a required load increase before start-up of the single shaft combined cycle power plant so as to generate a sufficient flow rate of steam. At that time, only the flow rate of the steam required by the low-pressure steam turbine 3L is allowed to pass through the low-pressure main steam control valve 18, while the remaining flow rate of the steam is allowed to flow in the condenser 19 through the auxiliary steam flow control valve 25 so as to make the sum of the flow rates of the steam passing through the both valves constant. As a result, it is possible to start up the single shaft combined cycle power plant without involving the above adverse affect.

In the fourth embodiment, occurrence of a delay in a control operation is considered which is due to the fact that a variation in the steam flow rate caused by rapid valve opening of the low-pressure main steam control valve 18 involves a time delay. Then, the valve opening degree detection value 43S from the valve opening degree sensor 43 for detecting the valve opening degree of the low-pressure main steam control valve 18 is inputted to the function generator 309 through the function generator 44 and subtractor 308 so as to calculate the valve opening degree instruction 309S. Thus, the flow rate of the auxiliary steam passing through the auxiliary steam flow control valve 25 becomes equal to the value of the flow rate setting instruction 308S for direct conversion between the valve opening degree and the steam flow rate. Alternatively, however, it is possible to detect the flow rate of the steam passing through the low-pressure main steam control valve 18 by using the flow rate detector (flow rate transmitter) as in the case of the first embodiment (FIG. 2).

[2] Gas Turbine Compressor Washing Operation Phase

As in the case of the normal start-up operation, the start-up boiler 22 is made to generate steam before start-up of the combined cycle power plant in the gas turbine compressor washing operation. Further, the steam flow rate required for increasing the rotation speed of the shaft 5 to a rotation speed allowing the washing operation of the gas turbine 1, that is, washing operation steam flow rate setting value 306S is set in advance in the washing operation steam flow rate setter 306.

When a "gas turbine compressor washing operation" instruction is sent out, the third and fourth switches 302 and 307 connect the input terminals (h) and (i) and input terminals (k) and (m) as denoted by broken lines, respectively. As a result, on the low-pressure main steam control valve 18 side, the washing operation rotation speed setting value 301S is selected by and outputted from the third switch 302. On the auxiliary steam flow control valve 25 side, the washing operation steam flow rate setting value 306S is outputted from the fourth switch 307 and inputted to the function generator 309 through the subtractor 308, and the valve opening degree instruction 309S corresponding to the washing operation steam flow rate setting value 306S is outputted from the function generator 309.

At the time point when the gas turbine compressor washing operation is selected, the low-pressure main steam control valve 18 is in a full closed state. Accordingly, the detection signal 43S indicating the valve opening degree of the low-pressure main steam control valve 18 detected by the valve opening degree sensor 43 is zero, and the flow rate 44S of the steam passing through the low-pressure main steam control valve 18 outputted from the function generator 44 is also zero, naturally.

Thus, the function generator 309 that has received as an input the deviation 308S, that is, washing operation steam flow rate setting value 306S from the subtractor 308 outputs the valve opening degree instruction 309S having a maximum value such that the flow rate of the steam passing through the auxiliary steam flow control valve 25 becomes equal to the washing operation steam flow rate setting value 306S.

As a result, at the time point when the gas turbine compressor washing operation is selected, the auxiliary steam flow control valve 25 is opened by the valve opening degree instruction 309S having a maximum value and, thereby, all the steam generated from the start-up boiler 22 flows in the condenser 19 through the auxiliary steam flow control valve 25.

In the washing operation rotation speed setter 301, the shaft rotation speed setting value 301S required in the gas turbine compressor washing operation is set in advance with respect to elapsed time (horizontal axis) from the start of the start-up phase. Thus, although the washing operation shaft rotation speed setting value 301S is zero before the start-up of the gas turbine 1, it is rapidly increased toward a washing rotation speed as time advances from the start-up of the gas turbine 1.

The subtractor 303 subtracts the shaft rotation speed 27S detected by the rotation speed detector 27 from the washing operation shaft rotation speed setting value S301 to calculate the deviation 303S.

The PI controller 304 receives as an input the deviation 303S and calculates the valve opening degree instruction 304S such that the shaft rotation speed 275 is equal to the washing operation shaft rotation speed setting value 301S.

Thus, the steam generated from the start-up boiler 22 is fed to the low-pressure steam turbine 3L according to the washing operation shaft rotation speed setting value 301S, whereby the rotation speed of the shaft 5 is increased to a washing rotation speed.

Thus, in the case of the gas turbine compressor washing operation, as in the case of the normal start-up operation, the control circuit of FIG. 9 reduces the flow rate of the steam passing through the auxiliary steam flow control valve 25 as the flow rate of the steam passing through the low-pressure main steam control valve 18 is increased without changing the total flow rate of the steam generated from the start-up boiler 22. Therefore, it is possible to perform the gas turbine compressor washing operation without involving a rapid increase in the load on the start-up boiler 22.

In general, the washing operation steam flow rate setting value 305S is smaller than the gas turbine self-sustained rotation steam flow rate setting value 107S, and the load on the start-up boiler 22 need not be significantly increased Therefore, the amount of fuel or water consumed by the start-up boiler 22 is small. Thus, the fourth embodiment can provide an economic gas turbine compressor washing operation method as well as solve the problem of a rapid increase in the load on the start-up boiler.

The gas turbine compressor washing operation has been described as one example of a non-ignition speed-up operation in which the shaft rotation speed is increased to a predetermined rotation speed without involving the gas turbine ignition. The present embodiment may also be applied to a gas turbine cooling operation which is another example of the non-ignition speed-up operation.

(Fifth Embodiment)

Figure 10:
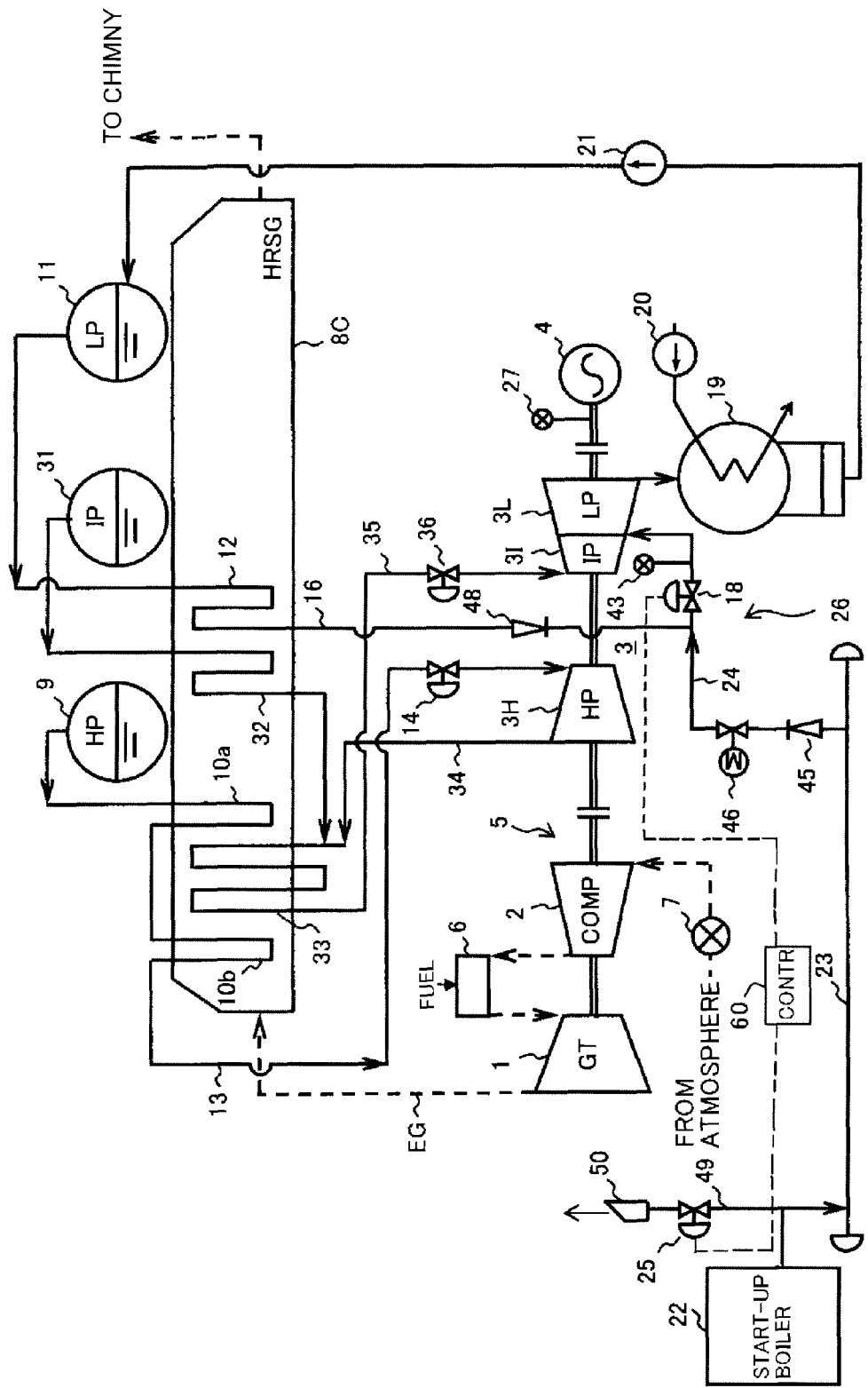
FIG. 10 is a system diagram showing the main part of the single shaft combined cycle power plant according to the fifth embodiment of the present invention.

FIG. 10 is a system diagram showing the main part of the single shaft combined cycle power plant according to a fifth embodiment of the present invention.

Descriptions of the parts in FIG. 10 overlapping the previous embodiments are omitted, and newly added parts will be intensively described.

In the above fourth embodiment, as shown in FIG. 8, the bypass pipe 47 is connected to the cooling steam supply pipe 23, which allows the steam generated from the start-up boiler 22 directly flow into the condenser 19 without passage through the low-pressure main steam control valve 18. And the auxiliary steam flow control valve 25 is provided in the bypass pipe 47.

In the fifth embodiment, as shown in FIG. 10, a start-up steam atmosphere discharge pipe 49 is connected, in place of the bypass pipe 47, to the auxiliary steam supply main pipe 23. The start-up steam atmosphere discharge pipe 49 allows the steam generated from the start-up boiler 22 to be directly discharged to the atmosphere without passage through the low-pressure main steam control valve 18. The auxiliary steam flow control valve 25 and a silencer 50 are provided in the start-up steam atmosphere discharge pipe 49.

The start-up boiler 22 generates a required flow rate of steam for increasing the rotation speed of the shaft 5 to a rotation speed allowing the self-sustained operation of the gas turbine 1 before the speed-up of the shaft 5 is started. At that time, the generated steam is allowed to be discharged to the atmosphere through the auxiliary steam flow control valve 25 and silencer 50 provided in the start-up steam atmosphere discharge pipe 49.

A configuration of the control circuit for the low-pressure main steam control valve 18 and the auxiliary steam flow control valve 25 according to the fifth embodiment is the same as that shown in FIG. 9.

Thus, in the case of the gas turbine cooling operation, when the steam is fed to the low-pressure main steam control valve 18 during the speed-up phase, the auxiliary steam flow control valve 25 is controlled as in the case of the fourth embodiment. That is, the sum of the flow rates of steam passing through the low-pressure main steam control valve 18 and the auxiliary steam flow control valve 25 is controlled to become equal to the flow rate of steam required for increasing the rotation speed of the shaft 5 to the rotation speed allowing the self-sustained operation.

In the case of the turbine compressor washing operation, as in the case of the fourth embodiment, the start-up boiler 22 generates a required flow rate of steam for the washing operation before the start-up of the gas turbine compressor washing operation (before the start of speed-up of the shaft 5). At that time, the generated steam is allowed to be discharged to the atmosphere through the start-up steam atmosphere discharge pipe 49, auxiliary steam flow control valve 25, and silencer 50.

In the case of the turbine compressor washing operation of this fifth embodiment, a control circuit diagram of FIG. 9 showing the low-pressure main steam control valve 18 and the auxiliary steam flow control valve 25 is also applied. That is, when the steam is fed to the low-pressure main steam control valve 18 during the speed-up phase, the auxiliary steam flow control valve 25 is controlled such that the sum of the flow rates of steam passing through the low-pressure main steam control valve 18 and the auxiliary steam flow control valve 25 becomes equal to the flow rate of steam required for allowing the washing operation.

The above flow rate control is performed by the start-up controller 60.

As described above, according to the fifth embodiment, in the case of the gas turbine compressor washing operation, as in the case of the normal gas turbine start-up operation, the flow rate of the steam passing through the auxiliary steam flow control valve 25 is reduced as the flow rate of the steam passing through the low-pressure main steam control valve 18 is increased without changing the total flow rate of the steam generated from the start-up boiler 22. Thus, the gas turbine compressor washing operation can be conducted without a rapid increase in the load on the start-up boiler 22.

The gas turbine compressor washing operation has been described as one example of a non-ignition speed-up operation in which the shaft rotation speed is increased to a predetermined rotation speed without involving the gas turbine ignition, similarly as in the fourth embodiment. The present embodiment may be applied to a gas turbine cooling operation which is another example of the non-ignition speed-up operation.

What is claimed is:

1. A single shaft combined cycle power plant comprising:
   a gas turbine that is driven by combustion gas and discharges exhaust gas;
   an exhaust heat recovery boiler that uses the exhaust gas from the gas turbine as a heat source and includes:
      a high-pressure drum for generating high-pressure steam;
      a low-pressure drum for generating low-pressure steam having a pressure lower than that of the high-pressure steam;
      an intermediate-pressure drum that generates intermediate-pressure steam having a pressure lower than the pressure of the high-pressure steam and higher than the pressure of the low-pressure steam; and
      a reheater that generates high temperature reheated steam;
   a high-pressure steam turbine that is coaxially arranged with the gas turbine and driven by the high-pressure steam fed from the high-pressure drum via a high-pressure steam control valve;
   a low-pressure steam turbine that is coaxially arranged with the high-pressure steam turbine;
   a power generator that is coaxially arranged with the low-pressure steam turbine;
   an intermediate-pressure steam turbine that is coaxially arranged with the high-pressure steam turbine and the low-pressure steam turbine, and driven by the high temperature reheat steam from the reheater;
   a low-pressure turbine steam supply system that has a low-pressure main steam control valve and that feeds a mixture of steam from the low pressure drum through the low-pressure main steam control valve and steam that has been adiabatically expanded in the intermediate-pressure steam turbine;
   a start-up boiler that generates auxiliary steam;
   a start-up time auxiliary steam supply pipe that connects the start-up boiler with a low-pressure turbine steam supply pipe at an upstream side relative to the low-pressure main steam control valve and feeds the auxiliary steam at start-up time;
   an auxiliary steam flow control valve that controls a flow rate of steam fed from the start-up time auxiliary steam supply pipe to the low-pressure turbine steam supply pipe;
   a low temperature reheat system that feeds steam from the high-pressure steam turbine together with the intermediate-pressure steam from the intermediate-pressure drum to the reheater; and
   a controller that feeds the auxiliary steam from the start-up boiler to the low-pressure steam turbine via the low-pressure turbine steam supply pipe by controlling a valve opening degree of the auxiliary steam flow control valve to allow the low-pressure steam turbine to generate a drive force to thereby perform speed-up control in a unified manner for the gas turbine, the high-pressure steam turbine, the intermediate-pressure steam turbine, the low-pressure steam turbine, and the power generator during a time period from when the gas turbine is started up to when a rotation speed of the gas turbine reaches a rotation speed allowing self-sustained operation using the combustion gas.

2. The single shaft combined cycle power plant according to claim 1, wherein
the auxiliary steam flow control valve is provided on the start-up time auxiliary steam supply pipe, and
during a time period from when the gas turbine is started up to when the rotation speed of the gas turbine reaches the rotation speed allowing self-sustained operation using the combustion gas, the controller feeds the auxiliary steam from the start-up boiler to the low-pressure steam turbine through the low-pressure turbine steam supply pipe by controlling valve opening degrees of the auxiliary steam flow control valve and the low-pressure main steam control valve to allow the low-pressure steam turbine to generate a drive force to thereby perform the speed-up control for the gas turbine, the high-pressure steam turbine, the intermediate-pressure steam turbine, the low-pressure steam turbine, and the power generator.

3. The single shaft combined cycle power plant according to claim 1, further comprising:
a condenser that condenses exhaust steam from the low-pressure steam turbine; and
a bypass pipe that connects the start-up time auxiliary steam supply pipe and the condenser, wherein
the auxiliary steam flow control valve is provided on the bypass pipe, and
before a start of a speed-up of the gas turbine, the controller makes the start-up boiler generate a required flow rate of steam for the low-pressure steam turbine for a purpose of increasing a rotation speed of the shaft up to the rotation speed allowing the self-sustained operation of the gas turbine and allows the auxilliary steam generated from the start-up boiler to flow in the condenser through the bypass pipe and the auxiliary steam flow control valve; and during a speed-up phase, the controller controls the auxiliary steam flow control valve such that a flow rate of the steam fed to the low-pressure steam turbine through the low-pressure main steam control valve becomes equal to a flow rate of the steam required for increasing the rotation speed of the shaft up to the rotation speed allowing the self-sustained operation of the gas turbine.

4. The single shaft combined cycle power plant according to claim 1, further comprising:
a start-up steam atmosphere discharge pipe that is connected to the start-up time auxiliary steam supply pipe and directly discharges steam to atmosphere, wherein
the auxiliary steam flow control valve and a silencer are disposed on the start-up steam atmosphere discharge pipe,
the auxiliary steam flow control valve is provided on a bypass pipe, and
before a start of a speed-up of the gas turbine, the controller makes the start-up boiler generate a required flow rate of steam for the low-pressure steam turbine for a purpose of increasing a rotation speed of the shaft up to the rotation speed allowing the self-sustained operation of the gas turbine and allows the auxiliary steam generated from the start-up boiler to be discharged to the atmosphere through the start-up steam atmosphere discharge pipe and the auxiliary steam flow control valve; and during a speed-up phase, the controller controls the auxiliary steam flow control valve such that a flow rate of the steam fed to the low-pressure steam turbine through the low-pressure main steam control valve becomes equal to a flow rate of the steam required for increasing the rotation speed of the shaft up to the rotation speed allowing the self-sustained operation of the gas turbine.

5. The single shaft combined cycle power plant according to claim 1, wherein
the low temperature reheat system has cooling steam systems for cooling a high temperature part of the gas turbine.

6. The single shaft combined cycle power plant according to claim 1, wherein
the controller makes the low-pressure main steam control valve open such that a valve opening degree of the low-pressure main steam control valve reaches a valve opening degree at which a required flow rate of auxiliary steam for the low-pressure steam turbine can be ensured after ignition of the gas turbine, before a time point at which a minimum required fuel flow rate for the gas turbine to hold a flame starts increasing.

7. The single shaft combined cycle power plant according to claim 1, wherein
a flow rate of auxiliary steam required for the low-pressure steam turbine is a flow rate required for the low-pressure steam turbine to generate a maximum drive torque in a drive torque range required for a speed-up of the gas turbine.

8. The single shaft combined cycle power plant according to claim 1, wherein
in order to increase the rotation speed of the gas turbine to the rotation speed allowing the self-sustained operation of the gas turbine using the combustion gas, the controller has an auxiliary steam pressure switch control section that switches pressure of the auxiliary steam to be fed from the start-up time auxiliary steam supply pipe to the low-pressure turbine steam supply pipe at least between two pressures of a predefined first pressure and a second pressure lower than the first pressure.

9. The single shaft combined cycle power plant according to claim 8, wherein
the first pressure is set to a pressure value at which the low-pressure main steam control valve is not fully opened even when the auxiliary steam for the low-pressure steam turbine to generate a maximum drive torque required for a speed-up of the gas turbine flows in the low-pressure main steam control valve, and
the second pressure is set to a pressure value at which both the low-pressure steam and the auxiliary steam can be fed to the low-pressure steam turbine through the low-pressure main steam control valve.

10. The single shaft combined cycle power plant according to claim 8, wherein
the auxiliary steam pressure switch control section sets a pressure of the auxiliary steam to the first pressure at a time of a fuel purge operation and an ignition of the gas turbine, and switches the pressure of the auxiliary steam from the first pressure to the second pressure during a time period in which the rotation speed of the gas turbine is higher than a rotation speed for the low-pressure steam turbine to generate a maximum drive torque required for a speed-up of the gas turbine and lower than the rotation speed allowing the self-sustained operation of the gas turbine using the combustion gas.

11. The single shaft combined cycle power plant according to claim 2, further comprising a switch means for selecting a non-ignition speed-up operation in which a shaft rotation speed is increased to a predetermined rotation speed without involving an ignition of the gas turbine.

12. A start-up method of a single shaft combined cycle power plant comprising:
a gas turbine that is driven by combustion gas and discharges exhaust gas;

an exhaust heat recovery boiler that uses the exhaust gas from the gas turbine as a heat source and includes:
- a high-pressure drum for generating high-pressure steam;
- a low-pressure drum for generating low-pressure steam having a pressure lower than that of the high-pressure steam;
- an intermediate-pressure drum that generates intermediate-pressure steam having a pressure lower than the pressure of the high-pressure steam and higher than the pressure of the low-pressure steam; and
- a reheater that generates high temperature reheated steam;

a high-pressure steam turbine that is coaxially arranged with the gas turbine and driven by the high-pressure steam fed from the high-pressure drum via a high-pressure steam control valve;

a low-pressure steam turbine that is coaxially arranged with the high-pressure steam turbine;

a power generator that is coaxially arranged with the low-pressure steam turbine;

an intermediate-pressure steam turbine that is coaxially arranged with the high-pressure steam turbine and the low-pressure steam turbine, and driven by the high temperature reheat steam from the reheater;

a low-pressure turbine steam supply system that has a low-pressure main steam control valve and that feeds a mixture of steam from the low pressure drum through the low-pressure main steam control valve and steam that has been adiabatically expanded in the intermediate-pressure steam turbine;

a start-up boiler that generates auxiliary steam;

a start-up time auxiliary steam supply pipe that connects the start-up boiler with the low-pressure turbine steam supply pipe at an upstream side relative to the low-pressure main steam control valve and feeds the auxiliary steam at start-up time;

an auxiliary steam flow control valve that controls a flow rate of steam fed from the start-up time auxiliary steam supply pipe to the low-pressure turbine steam supply pipe; and a low temperature reheat system that feeds steam from the high-pressure steam turbine together with the intermediate-pressure steam from the intermediate-pressure drum to the reheater, wherein during a time period from when the gas turbine is started up to when a rotation speed of the gas turbine reaches a rotation speed allowing self-sustained operation using the combustion gas, the auxiliary steam from the start-up boiler is fed to the low-pressure steam turbine via the low-pressure turbine steam supply system by controlling a valve opening degree of the auxiliary steam flow control valve to allow the low-pressure steam turbine to generate a drive force to thereby perform speed-up control in a unified manner for the gas turbine, the high-pressure steam turbine, the intermediate-pressure steam turbine, the low-pressure steam turbine, and the power generator.

* * * * *